US012668068B2

(12) United States Patent
Ishikawa et al.

(10) Patent No.: US 12,668,068 B2
(45) Date of Patent: Jun. 30, 2026

(54) DATA PROCESSING APPARATUS, DATA PROCESSING METHOD, PRINTING APPARATUS, PRINTING METHOD, AND STORAGE MEDIUM

(71) Applicant: CANON KABUSHIKI KAISHA, Tokyo (JP)

(72) Inventors: Tomokazu Ishikawa, Kanagawa (JP); Fumitaka Goto, Tokyo (JP); Akitoshi Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 18/326,980

(22) Filed: May 31, 2023

(65) Prior Publication Data

US 2023/0391106 A1 Dec. 7, 2023

(30) Foreign Application Priority Data

Jun. 7, 2022 (JP) ................................. 2022-092417
Jun. 7, 2022 (JP) ................................. 2022-092439

(51) Int. Cl.
*B41J 2/36* (2006.01)
*B41J 2/355* (2006.01)

(52) U.S. Cl.
CPC ............... *B41J 2/3558* (2013.01); *B41J 2/36* (2013.01); *B41J 2/362* (2013.01)

(58) Field of Classification Search
CPC ............. B41J 2/3558; B41J 2/36; B41J 2/362
See application file for complete search history.

(56) References Cited

U.S. PATENT DOCUMENTS

| | | | | |
|---|---|---|---|---|
| 6,126,264 | A | 10/2000 | Suzuki et al. | |
| 8,953,234 | B2 | 2/2015 | Iguchi et al. | |
| 10,915,036 | B2 | 2/2021 | Ogawa et al. | G03G 15/01 |
| 10,953,664 | B2 | 3/2021 | Fujita et al. | B41J 2/35 |

(Continued)

FOREIGN PATENT DOCUMENTS

| | | |
|---|---|---|
| JP | H02-036962 A | 2/1990 |
| JP | H03-114761 A | 5/1991 |

(Continued)

OTHER PUBLICATIONS

Office Action dated Apr. 28, 2026, in Japanese Patent Application No. 2022-092417.

*Primary Examiner* — Yaovi M Ameh
(74) *Attorney, Agent, or Firm* — Venable LLP

(57) ABSTRACT

A data processing apparatus includes a plurality of heat-generating elements configured to apply different heating energies to a print medium in which a plurality of color development layers which develop colors different from each other upon receipt of the different heating energies are laminated. In addition, a printing apparatus includes: an obtaining unit configured to obtain a heat-generating characteristic of each of the plurality of heat-generating elements; and a deriving unit configured to derive a correction value for correcting print data based on a color development heating characteristic of each of the plurality of color development layers and the heat-generating characteristic of each heat-generating element, the print data causing each heat-generating element to generate the heating energy based on image data corresponding to a pixel.

14 Claims, 14 Drawing Sheets

(56) References Cited

U.S. PATENT DOCUMENTS

| | | | | |
|---|---|---|---|---|
| 11,104,156 | B2 | 8/2021 | Tsuchiya et al. | B41J 2/355 |
| 11,662,680 | B2 | 5/2023 | Sasaki et al. | B41J 2/315 |
| 2017/0246881 | A1* | 8/2017 | Inokuchi | B41J 2/355 |
| 2021/0141328 | A1* | 5/2021 | Sasaki | B41J 2/355 |

FOREIGN PATENT DOCUMENTS

| | | | |
|---|---|---|---|
| JP | H05-16409 | A | 1/1993 |
| JP | H07-314750 | A | 12/1995 |
| JP | H10-324016 | A | 12/1998 |
| JP | 2004-167752 | A | 6/2004 |
| JP | 2005-007701 | A | 1/2005 |
| JP | 2006-15658 | A | 1/2006 |
| JP | 2006-343682 | A | 12/2006 |
| JP | 2012-076414 | A | 4/2012 |
| JP | 2013-208786 | A | 10/2013 |
| JP | 2015-051584 | A | 3/2015 |
| JP | 2016-068360 | | 5/2016 |
| JP | 2018-056819 | A | 4/2018 |
| JP | 2019-214206 | A | 12/2019 |

* cited by examiner

DATA PROCESSING APPARATUS, DATA PROCESSING METHOD, PRINTING APPARATUS, PRINTING METHOD, AND STORAGE MEDIUM

BACKGROUND OF THE INVENTION

Field of the Invention

The present disclosure relates to a data processing technique and a printing technique for forming an image by heating a print medium in which a plurality of color development layers which respectively develop different colors are laminated, by using a plurality of heat-generating elements.

Description of the Related Art

Thermal printing has conventionally been known which performs color printing by using a print medium such as thermal paper or ink ribbon. Regarding such thermal printing, Japanese Patent Laid-Open No. 2016-68360 discloses a technique for reducing uneven density of a print image by correcting applied energy to heat-generating elements based on thermal and mechanical variations in a plurality of heat-generating elements arrayed in one line in a thermal transfer printing apparatus.

However, in Japanese Patent Laid-Open No. 2016-68360, applied energy applied to each heat-generating element is corrected in accordance with variations in the heat-generating elements regardless of a color of an ink region to be heated. For this reason, even when the heat generation amounts of the heat-generating elements are corrected by the correction technique disclosed in Japanese Patent Laid-Open No. 2016-68360 for a print medium in which a plurality of color development layers having different color development heating characteristics are laminated, each color development layer cannot be properly caused to develop colors.

SUMMARY OF THE INVENTION

An object of the present disclosure is to provide a technique capable of properly developing colors in a print medium in which a plurality of different color development layers are laminated, by using a plurality of heat-generating elements.

In a first aspect of the present disclosure, there is provided A data processing apparatus which processes data for controlling a plurality of heat-generating elements configured to apply heating energies to a print medium in which a plurality of color development layers which develop colors different from each other upon receipt of different heating energies respectively are laminated, the data processing apparatus comprising: an obtaining unit configured to obtain a heat-generating characteristic of each of the plurality of heat-generating elements; and a deriving unit configured to derive a correction value for correcting print data based on a color development heating characteristic of each of the plurality of color development layers and the heat-generating characteristic of each heat-generating element, the print data causing each heat-generating element to generate the heating energy based on image data corresponding to a pixel.

In a second aspect of the present disclosure, there is provided A data processing method for processing data for controlling a plurality of heat-generating elements configured to apply heating energies to a print medium in which a plurality of color development layers which develop colors different from each other upon receipt of different heating energies respectively are laminated, the data processing method comprising: obtaining a heat-generating characteristic of each of the plurality of heat-generating elements; and deriving a correction value for correcting print data based on a color development heating characteristic of each color development layer and the heat-generating characteristic of each heat-generating element, the print data causing each heat-generating element to generate the heating energy based on image data corresponding to a pixel.

In a third aspect of the present disclosure, there is provided A non-transitory computer-readable print medium storing a program for causing a computer to execute a data processing method, wherein the data processing method processes data for controlling a plurality of heat-generating elements configured to apply different heating energies to a print medium in which a plurality of color development layers which develop colors different from each other upon receipt of the different heating energies are laminated, the data processing method comprising: obtaining a heat-generating characteristic of each of the plurality of heat-generating elements; and deriving a correction value for correcting print data based on a color development heating characteristic of each color development layer and the heat-generating characteristic of each heat-generating element, the print data causing each heat-generating element to generate the heating energy based on image data corresponding to a pixel.

In a fourth aspect of the present disclosure, there is provided A printing apparatus including a plurality of heat-generating elements configured to apply heating energies to a print medium in which a plurality of color development layers which develop colors different from each other upon receipt of different heating energies respectively are laminated, the printing apparatus comprising: an obtaining unit configured to obtain a heat-generating characteristic of each of the plurality of heat-generating elements; a generating unit configured to generate print data based on a color development heating characteristic of each of the plurality of color development layers and the heat-generating characteristic, the print data causing each of the plurality of heat-generating elements to generate the heating energy based on image data corresponding to a pixel; and a drive control unit configured to cause each of the plurality of heat-generating elements to generate the heating energy based on the print data.

In a fifth aspect of the present disclosure, there is provided A printing method for printing an image by causing a plurality of heat-generating elements to apply heating energies to a print medium in which a plurality of color development layers which develop colors different from each other upon receipt of different heating energies are laminated respectively, the printing method comprising: obtaining a heat-generating characteristic of each of the plurality of heat-generating elements; and generating print data based on a color development heating characteristic of each of the plurality of color development layers and the heat-generating characteristic, the print data causing each of the plurality of heat-generating elements to generate the heating energy based on image data corresponding to a pixel; and causing each of the plurality of heat-generating elements to generate the heating energy based on the print data.

In a sixth aspect of the present disclosure, there is provided A non-transitory computer-readable storage medium storing a program for causing a computer to execute a printing method, wherein the printing method prints an image by causing a plurality of heat-generating elements to apply heating energies to a print medium in which a plurality of color development layers which develop colors different from each other upon receipt of different heating energies respectively are laminated, the printing method comprising: obtaining a heat-generating characteristic of each of the plurality of heat-generating elements; generating print data based on a color development heating characteristic of each of the plurality of color development layers and the heat-generating characteristic, the print data causing the plurality of heat-generating elements to generate the heating energy based on image data corresponding to a pixel; and causing each of the plurality of heat-generating elements to generate the heating energy based on the print data.

Further features of the present invention will become apparent from the following description of exemplary embodiments with reference to the attached drawings.

DESCRIPTION OF THE EMBODIMENTS

Hereinafter, embodiments of the present disclosure are described in detail with reference to the attached drawings. Note that the following embodiments are not intended to limit the present disclosure according to the claims, and all combinations of characteristics described in the present embodiments are not necessarily essential to the solution of the present disclosure.

First Embodiment

<Print Medium>

Figure 1:
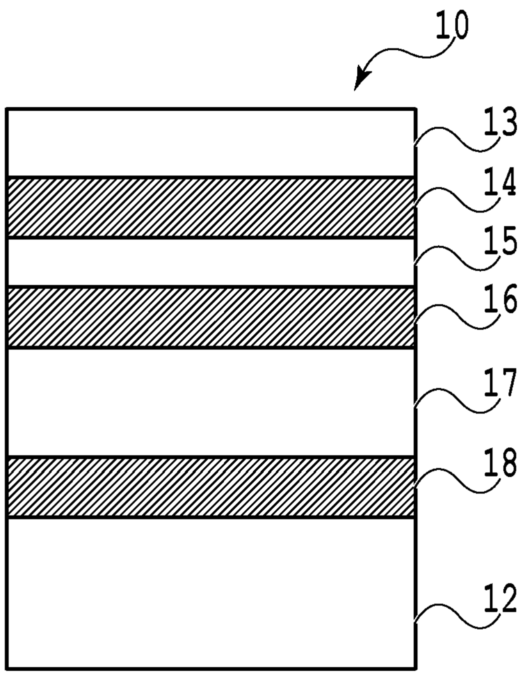
FIG. 1 is a diagram showing a structure of a print medium used in a present embodiment.

FIG. 1 is a diagram showing a structure of a print medium used in the present embodiment. A print medium 10 is formed by sequentially laminating a third image formation layer 18, a second spacer layer 17, a second image formation layer 16, a first spacer layer 15, a first image formation layer 14, and a protective layer 13 on a substrate 12. The protective layer 13 side (the upper side of FIG. 1) is a front surface, and is a side on which a printing head described later comes into contact with the print medium 10, and a formed image is observed.

The substrate 12 is a white layer which reflects light, and the protective layer 13 is a transparent layer. The first image formation layer (first color development layer) 14, the second image formation layer (second color development layer) 16, and the third image formation layer (third color development layer) 18 are basically colorless and transparent, but are activated at unique temperatures, respectively, to develop different colors (yellow, magenta, and cyan).

The first spacer layer 15 and the second spacer layer 17 are layers for controlling diffusion of heat applied to the protective layer 13, the respective thicknesses of which are adjusted in accordance with the speed of diffusion of heat, activation temperatures of the three image formation layers, and the like.

The time required for a temperature applied to the front surface to reach the lower image formation layer depends on the thicknesses of the spacer layers, and applied heat diffuses and dissipates. For this reason, for example, it is possible to activate only the upper image formation layer but not activate the lower image formation layer by applying heat higher than the activation temperatures of the upper and lower image formation layers to the front surface of the print medium for a short period of time. In addition, it is possible to activate the lower image formation layer without activating the upper image formation layer by applying a temperature higher than the activation temperature of the lower image formation layer and lower than the activation temperature of the upper image formation layer for a long period of time. That is, it is possible to separately activate the first image formation layer 14, the second image formation layer 16, and the third image formation layer 18 and adjust color development by adjusting parameters such as the temperature (heating temperature) and the application time of heat to be applied to the front surface of the protective layer 13 in accordance with image data.

Then, in the print medium after the formation of the image, light incident on the protective layer 13 penetrates the spacer layers and the image formation layer which is not activated, and is reflected on the image formation layer which has been activated or on the substrate 12. Hence, when visually observing the print medium 10 from the front surface side, the observer can visually recognize a color in accordance with the combination of beams of light reflected on the individual image formation layers, and can thus recognize the light as an image.

Colors to be developed in the three image formation layers (color materials) are not particularly limited. In the following, a case of using a print medium in which the first image formation layer 14 contains a yellow color material, the second image formation layer 16 contains a magenta color material, and the third image formation layer 18 contains a cyan color material as a first print medium is described, but the configuration of a print medium that can be applied to the present disclosure is not limited to this.

In general, in a print medium used in a case of forming a full-color image, the first image formation layer 14, the second image formation layer 16, and the third image formation layer 18 are configured to develop yellow, magenta, and cyan, respectively, as described above. However, the order of colors (the order of laminations) of the respective image formation layers and combinations of colors to be developed in the print medium 10 that can be applied to the present disclosure are not limited to the example shown in FIG. 1. Moreover, although in the example shown in FIG. 1, image formation layers (color development layers) corresponding to three colors are provided, image formation layers corresponding to a larger number of colors or image formation layers corresponding to a smaller number of colors may be provided. Although in FIG. 1, the thicknesses of the image formation layers are the same, image formation layers having different thicknesses in accordance with colors (color materials) may be provided.

In addition, the thicknesses of the spacer layers 15 and 17 provided among the image formation layers 14, 16, and 18 can be set as appropriate in accordance with the color development heating characteristics of the respective image formation layers 14, 16, and 18, the thermal conductive characteristics and thermal diffusivities of the respective spacer layers 15 and 17, and the like. The spacer layers may be formed of the same material, or may be formed of different materials. Since the spacer layers play a function of controlling the diffusion of heat in the print medium 10, in a case where the first spacer layer 15 and the second spacer layer 17 are formed of the same material, it is preferable that the second spacer layer 17 be formed in a thickness four times or more that of the first spacer layer 15.

In addition, although the three image formation layers (first to third image formation layers) 14, 16, and 18 in the print medium 10 shown in FIG. 1 are disposed on the same one surface side of the substrate 12, some image formation layers may be disposed on the opposite surface side of the substrate 12.

Note that although the heating on the print medium 10 is preferably performed by using a printing head which applies heat to a print medium, other method may also be used. For example, it is also possible to use a printing head using a known other heating device such as a modified light source (device such as laser).

<Color Development Heating Characteristic>

Figure 2:
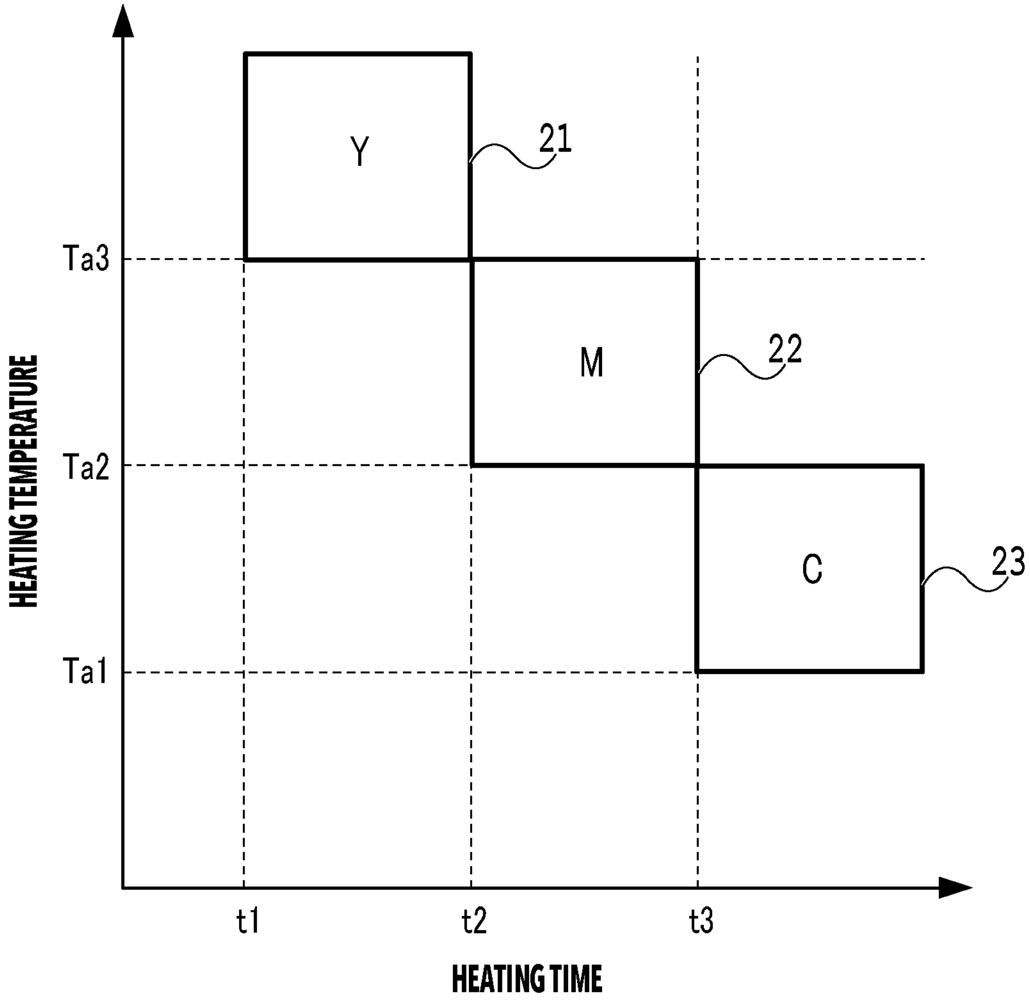
FIG. 2 is a diagram for explaining a color developing condition of a first print medium.

FIG. 2 is a diagram for explaining a color developing condition of the first print medium. In FIG. 2, the horizontal axis indicates the time during which to heat the front surface of the print medium 10 (heating time), and the vertical axis indicates the temperature at which to heat the same (heating temperature). Then, combinations of heating times for and heating temperatures at which the first image formation layer 14 containing a color developing material of yellow (Y), the second image formation layer 16 containing a color developing material of magenta (M), and the third image formation layer 18 containing a color developing material of cyan (C) activate are shown as a region 21, a region 22, and a region 23.

As shown in FIG. 2, a yellow layer, which is the first image formation layer 14, develops the color when a temperature of Ta3 or more is applied thereto for t1 or more. A magenta layer, which is the second image formation layer 16, develops the color when a temperature of Ta2 (<Ta3) or more is applied thereto for t2 (>t1) or more. A cyan layer, which is the third image formation layer 18, develops the color when a temperature of Ta1 (<Ta2<Ta3) or more is applied thereto for t3 (>t2>t1) or more.

For example, to a region where only yellow is desired to be developed, a temperature of Ta3 or more may be applied for t1 or more and t2 or less. To a region where only magenta is desired to be developed, a temperature of Ta2 or more and Ta3 or less may be applied for t2 or more and t3 or less. To a region where only cyan is desired to be developed, a temperature of Ta1 or more and Ta2 or less may be applied for t3 or more. In this way, it is possible to express a color space resulting from a combination of yellow, magenta, and cyan by separately controlling the color developments of the respective color elements.

Ta1, Ta2, and Ta3 are values adjusted by materials contained in the respective image formation layers, but are preferably set with appropriate intervals (temperature differences) within a range from about 90° C. to about 300° C. in general. For example, Ta1 is required to be set to as low a temperature as possible within such a range that does not cause activation during shipment and storage, and is preferably around 100° C. On the other hand, Ta3 is required to be a temperature that does not cause the second and third image formation layers 15 and 18, which are located in lower layers, to activate with diffusion of heat for a short period of time, and is preferably around 200° C. Ta2 is required to be a temperature that does not reach Ta1 or Ta3 even when some change in temperature occurs, and is preferably around 140° C. to 180° C.

Note that each image formation layer varies in density of the color to be formed depending on the position within the region even in a case where a heating energy within the corresponding region is applied. For example, in a case where a heating energy within the region 22 is applied to the second image formation layer 16, an image having a higher density is formed by applying a temperature close to Ta3 than by applying a temperature close to Ta2 even with the same heating time.

<Printing Head>

Figure 3A:
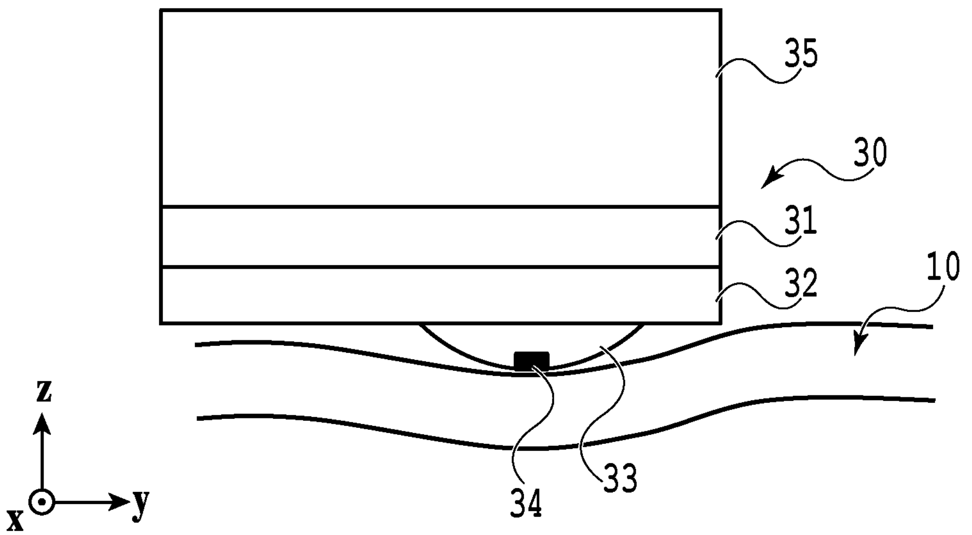
FIGS. 3A and 3B are views for explaining a printing head.
Figure 3B:
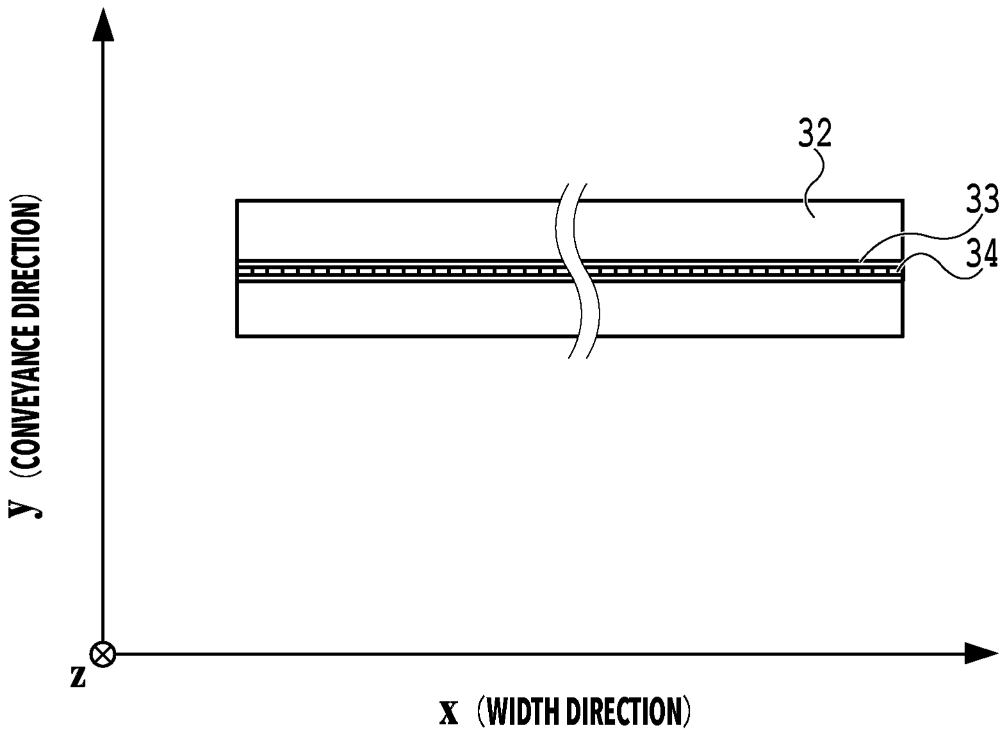

FIGS. 3A and 3B are views for explaining a printing head 30 used in the present embodiment. FIG. 3A is a side view showing a state in which print processing is being performed on the print medium 10, and FIG. 3B is a plan view showing a surface of the printing head 30 which is brought into contact with the print medium 10.

As shown in FIG. 3A, on one surface of a base 31 of the printing head 30, a glaze 32 and a convex glaze 33 formed of the same material as the glaze 32 are provided. In the most protruding portion of the convex glaze 33, heat-generating elements 34 are disposed. Note that it is preferable that a protective film (not shown) for protecting the glaze 32, the convex glaze 33, and the heat-generating elements 34 be provided in such a manner as to cover the front surface. Note that the convex glaze 33 is not an essential configuration, and the heat-generating elements 34 may be disposed on the glaze 32 formed of a flat plate. On the opposite surface of the base 31, a heat sink 35 is provided, so that the entire printing head is cooled by using a fan.

The x direction shown in FIGS. 3A and 3B corresponds to the width direction of the print medium 10, and the print medium 10 is conveyed in the y direction intersecting (orthogonally intersecting in the present example) the x direction at a predetermined speed while being in contact with the convex glaze 33 and the heat-generating elements 34 of the printing head 30.

In the printing head 30, as shown in FIG. 3B, the glaze 32 and the convex glaze 33 extend in the x direction by such a distance as to cover the width of the print medium and in the convex glaze 33, the plurality of heat-generating elements 34 are substantially linearly disposed along the x direction (first direction). In the present embodiment, each heat-generating element 34 has a length in the x direction set to about 40 μm and a length in the y direction set to about 120 μm. In a case where the print medium 10 is conveyed as in FIG. 3B, the print medium 10 comes into contact with the convex glaze 33 including the heat-generating element 34 in a length of about 200 micron or more.

Each of the heat-generating elements arrayed in the printing head generates heat upon supply of current, and the heat is applied to the print medium 10. The print medium is conveyed while receiving heat from an electrical resistance of the printing head 30, and each image formation layer develops the color due to the applied heat. In this way, an image is formed in each line along the array direction of the heat-generating elements 34. Note that in the present embodiment, an infrared imaging system in which the heat-generating elements 34 as a heat generation source irradiate a print medium with an infrared ray to heat the print medium is employed; however, other systems or heat sources may be used.

The time during which the printing head 30 applies heat to the print medium 10 is typically within a range from about 0.001 milliseconds to about 100 milliseconds for each line of an image. The upper limit of the heat application time is set in accordance with the printing speed, and the lower limit of the heat application time is determined in accordance with a restriction of an electronic circuit (not shown).

One pixel region in the print medium 10 is determined, in the x direction, by the size of the heat-generating element 34 and, in the y direction, by the size of the heat-generating element 34 and the conveyance speed of the print medium 10. Hence, the size of one pixel region is not particularly limited, but in general, 100 to 600 dpi (dot/inch) in the x direction and the y direction. The size of the one pixel region in the x direction and the size of the region in the y direction may be different. It is assumed that in the present embodiment, one pixel has a region having a size of about 40 μm in both the x direction and the y direction. That is, in the print medium 10, the individual pixels are arrayed at a density of about 600 dpi (dot/inch).

<Printing Apparatus>

Figure 4:
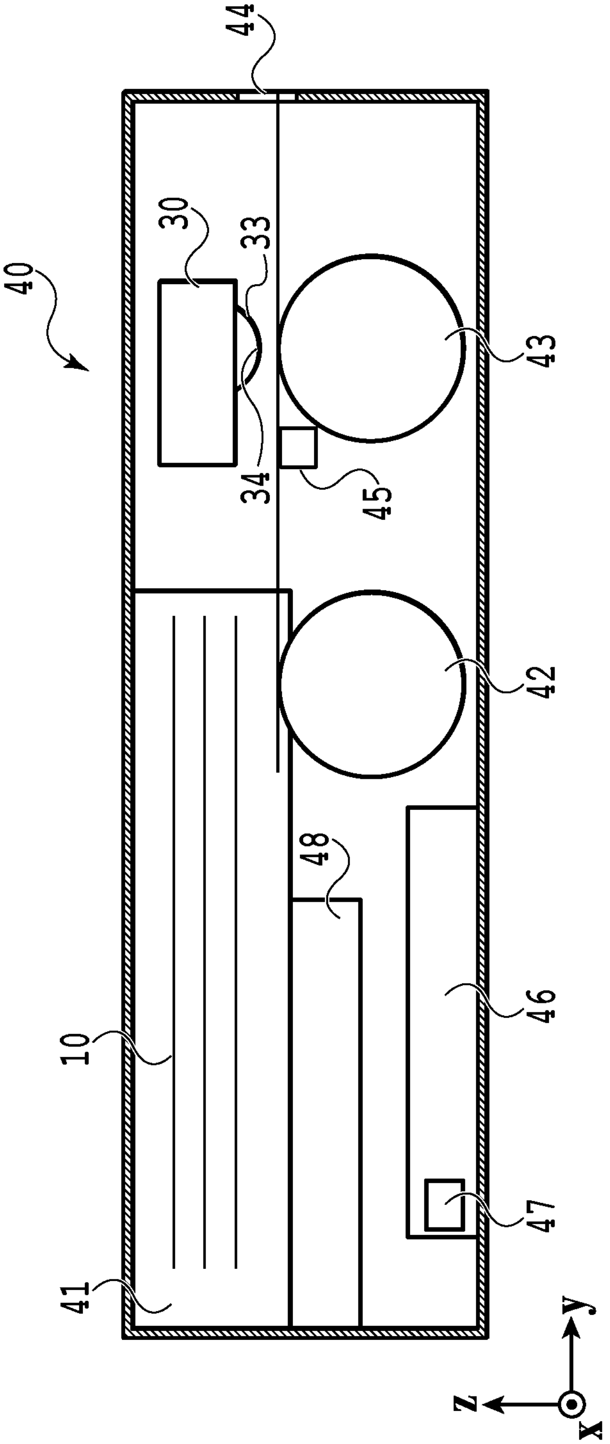
FIG. 4 is an internal configuration diagram of a printing apparatus according to the first embodiment.

FIG. 4 is an internal configuration diagram of a printing apparatus according to the present embodiment. Note that in FIG. 4, the x direction indicates the width direction of the print medium 10, the y direction indicates the conveyance direction of the print medium 10, and the z direction indicates the vertical direction. In the printing apparatus provided are the printing head 30, a holding portion 41, a conveyance roller 42, a platen 43, a discharge port 44, a temperature sensor 45, a camera (obtaining unit) 46, an image-capturing button 47, a battery 48, and the like. The print medium 10 before printing is held in the holding portion 41. In this case, a plurality of pieces of the print medium 10 are stacked in a state where the front surfaces thereof (the protective layer 13 side in FIG. 1) is facing above (+z direction).

Upon receipt of a print job, the conveyance roller 42 rotates to convey the print medium 10 located in the lowermost layer in the y direction. In this way, the print medium 10 is sent to a printing section in which the printing head 30 and the platen 43 are disposed. In the printing section, the convex glaze 33 of the printing head 30 comes into contact with the front surface (upper surface) of the conveyed print medium 10, and the platen 43 supports the print medium 10 from the bottom surface. The heat-generating elements 34 are driven in accordance with print data, and the print medium 10 develops colors upon receipt of heat applied by the heat-generating elements 34. The print medium after the printing is made by the printing head 30 is discharged through the discharge port 44.

The temperature sensor 45 is provided in a periphery of the printing head 30 and the nip portion of the platen 43, and detects the temperature supplied by the printing head Note that the target to be detected by the temperature sensor 45 may be, for example, the temperature of the heat-generating elements 34 as the heat source included in the printing head 30, or the temperature of the front surface of the print medium 10. In addition, the plurality of temperature sensors 45 are disposed along the width direction of the printing head 30 and configured to be capable of measuring the entire region in the width direction of the print medium 10. The conveyance speed of the print medium 10 is controlled in accordance with the speed of image formation, the resolution at the time of image formation, and the like. For example, in a case where an image having a high resolution is formed, such control as to lower the conveyance speed as compared with a case where an image having a low resolution is formed is performed. In addition, in a case where the printing speed is prioritized, such control as to increase the conveyance speed and lower the resolution is performed.

<System Configuration>

Figure 5:
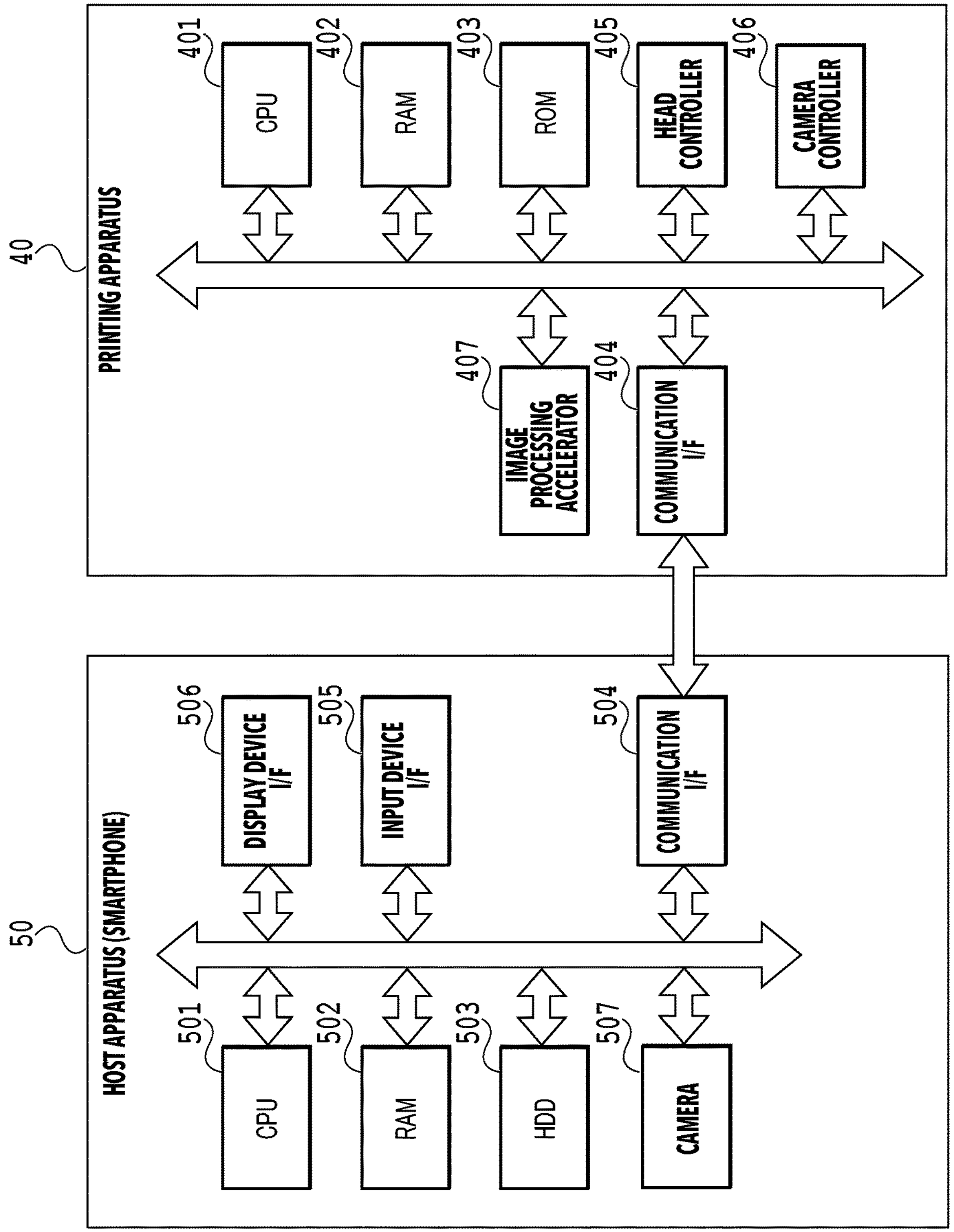
FIG. 5 is a block diagram for explaining a configuration of control in a printing system.

FIG. 5 is a diagram showing an example of an overall configuration of a system including a data processing apparatus in the present embodiment. As shown in FIG. 5, the system according to the present embodiment includes the printing apparatus 40 shown in FIG. 4, and a smartphone 50 serving as a host apparatus of the printing apparatus 40. The host apparatus may be a personal computer, a tablet terminal, or a digital camera besides the smartphone 50.

The smartphone 50 includes a CPU (Central Processing Unit) 501, a RAM (Random Access Memory) 502, and a HDD (Hard Disk Drive) 503. Moreover, the smartphone 50 includes a communication I/F 504, an input I/F 505, a display device I/F 506, a camera 507, and the like. These constituent elements are connected via an internal bus to be capable of communicating with one another.

The CPU 501 executes processes in accordance with programs and various data held in the HDD 503 and the RAM 502. The RAM 502 is a volatile storage and temporality holds programs and data. In addition, the HDD 503 is a non-volatile storage, and holds programs and data. The camera 507 is a device capable of capturing an image upon an operation of the user, and the captured image data is held in the HDD 503.

The communication I/F 504 is an interface which manages communications with an external apparatus, and here controls transmission and reception of data to and from the printing apparatus 40. As the connection method for transmission and reception of data here, wired connection such as USB and wireless connection such as Bluetooth (registered trademark) and WiFi (registered trademark) can be used. The input device I/F 505 is an interface for controlling HID (Human Interface Device) such as a touch panel, and receives an input by the user. The display device I/F 506 controls display in a display device, which is not shown, for displaying a captured image, image data, and the like.

The printing apparatus 40 includes a CPU 401 which configures the data processing apparatus, a RAM 402, a ROM 403, a communication I/F 404, a head controller 405, a camera controller 406, an image processing accelerator 407, and the like. These constituent elements are connected via an internal bus to be capable of communicating with one another. The CPU 401 transfers programs and various data held in the ROM 403 and the RAM 402 to predetermined memory regions of the RAM 402, and executes processes of the respective embodiments, which are described later in correspondence with these programs and data. The RAM 402 is a volatile storage, and temporarily holds programs and data transferred by the CPU 401 and the like as described above. In addition, the ROM 403 is a non-volatile storage, and holds table data and programs used in the processes described below.

The communication I/F 404 is an interface which manages communications with an external apparatus, and here controls transmission and reception of data to and from the smartphone 50. The head controller 405 controls heating operation on the printing head 30 shown in FIGS. 3A and 3B based on print data. Specifically, the head controller 405 reads control parameters and print data from predetermined addresses of the RAM 402. Then, when the CPU 401 writes the control parameters and the print data in the predetermined addresses of the RAM 402, the processing by the head controller 405 starts to cause the printing head 30 to perform the heating operation.

The camera controller 406 controls the operation of the camera 46 shown in FIG. 4. Specifically, when the user presses the image-capturing button 47, the camera controller 406 issues an image-capturing instruction to the camera 46, and upon receipt of the image-capturing instruction, the camera 46 captures an image. The image thus captured is temporarily held in the RAM 402.

In a case where a captured image or the like is to be printed, the head controller 405 starts the processing and controls the heating operation by the printing head 30 on the print medium. The image processing accelerator 407 is configured with hardware, and can execute predetermined image processing at a high speed.

In performing the image processing, the CPU 401 first writes parameters and data necessary for the image processing in predetermined addresses of the RAM 402. In response to this, the image processing accelerator 407 is activated to start the predetermined image processing. Note that in the present disclosure, the image processing accelerator 407 is not necessarily an essential element. It is also possible to cause the CPU 401 to execute table parameter creation processing, which is described later, and image processing depending on the specifications of the printing apparatus 40, and the like.

In addition, the temperature sensor 45 detects the ambient temperature of the heat-generating elements 34 of the printing head 30 and provides the result of detection to the CPU 401 or the like as temperature information. The CPU 401 performs various processing for performing the heat-generation control on each heat-generating element 34 of the printing head 30 based on predetermined obtained information including the temperature information and the like. The details of the processing and controls executed by the CPU 401 are described later.

Note that although the present embodiment shows as an example of the system configuration in which independent two apparatuses, namely, the printing apparatus 40 and the smartphone 50 are communicatively connected, it is also possible to implement this system configuration in a single apparatus. In addition, it is also possible to implement the above-described system configuration in an apparatus in which the printing apparatus 40 and an imaging device (not shown) are integrated.

<Printing Service>

Figure 6:
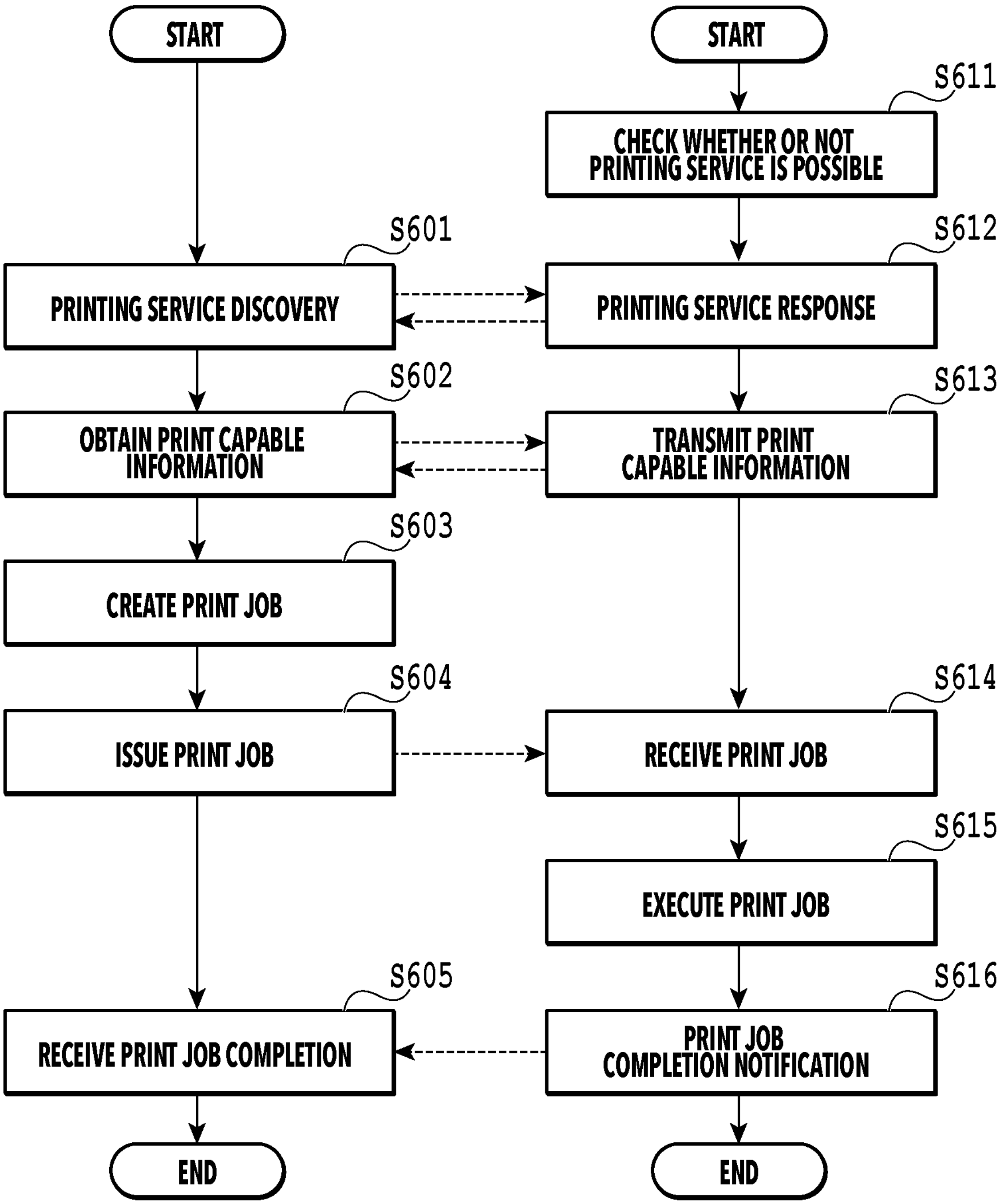
FIG. 6 is a flowchart for explaining printing service provision processing.

FIG. 6 is a flowchart showing a flow of a series of processes in a printing service provision processing. In FIG. 6, processes of S601 to 605 are executed in the smartphone and processes of S611 to S616 are executed in the printing apparatus 40. These processes are performed by the CPUs provided in the respective apparatuses. Specifically, in the smartphone 50, which is the host apparatus, the CPU 501 performs the processes of S601 to S605 by reading and executing programs held in the HDD 503 and the RAM 502. In addition, in the printing apparatus 40, the CPU 401 performs the processes of S611 to S616 by reading and executing programs held in the ROM 403 and the RAM 402. Note that in FIG. 6, dashed arrows indicate transmission and reception of data.

Once the printing apparatus 40 is powered on, the printing apparatus 40 confirms that the printing apparatus 40 itself is capable of printing in S611, and once the print capable state is confirmed, the printing apparatus 40 enters a standby state.

On the other hand, the smartphone 50 implements printing service Discovery in S601. Here, as the printing service Discovery, the smartphone 50 performs search processing for peripherals in accordance with the operation by the user, or search processing for periodically searching for a printing apparatus in a state of capable of providing a printing service, or the like. Note that the smartphone 50 may perform a process of making an inquiry upon connection between the smartphone 50 and the printing apparatus 40, or the like.

In S612, upon receipt of the printing service Discovery from the smartphone 50, the printing apparatus 40, as a response to this, notifies the smartphone 50 that it is an apparatus which can provide the printing service.

In S602, in a case where the smartphone 50 receives from the printing apparatus 40 the notification that the printing apparatus 40 can provide the printing service, the smartphone 50 requests print capable information from the printing apparatus 40.

In S613, as a response to the request for print capable information from the smartphone 50, the printing apparatus 40 notifies the smartphone 50 of information on the printing service which the printing apparatus 40 can provide.

Upon receipt of the print capable information from the printing apparatus 40, the smartphone 50 generates a user interface for creating a print job based on the print capable information in S603. Specifically, the smartphone 50 causes the display (not shown) to display information on the designation of the print image, print size, printable paper size, and the like, and information indicating appropriate options, based on the print capable information of the printing apparatus 40. Then, the smartphone 50 receives the setting performed by the user via the input device (not shown) such as a touch panel. Thereafter, in S604, the smartphone 50 issues a print job based on the setting information received from the user, and transmits the print job to the printing apparatus 40.

In S614, the printing apparatus 40 receives the print job from the smartphone 50. Then, the printing apparatus 40 analyzes the received print job and executes the print job (S615). The detail of the processing (print processing) corresponding to the print job is described later.

Upon completion of the print processing, the printing apparatus 40 transmits print job completion notification information to the smartphone 50 in S616. In this way, the processing on the printing apparatus 40 side is completed, and the printing apparatus 40 enters the standby state.

On the other hand, in S605, the smartphone 50 receives the print job completion notification information, and displays the notification information on the display to notify the user. In this way, the processing on the smartphone 50 side completes.

Note that in the above description, a so-called Pull-type communication method in which the smartphone 50 make a request to the printing apparatus 40, and the printing apparatus 40 responds to the request as various information transmissions is given as an example. However, the communication method performed between the smartphone 50 and the printing apparatus 40 is not limited to the Pull-type communication. It is also possible to employ a so-called Push-type communication method in which the printing apparatus 40 voluntarily transmits information to one or more smartphones 50 present on the network.

<Printing Head Control>

A heating control of the printing head 30 performed in the present embodiment is described.

Figure 7:
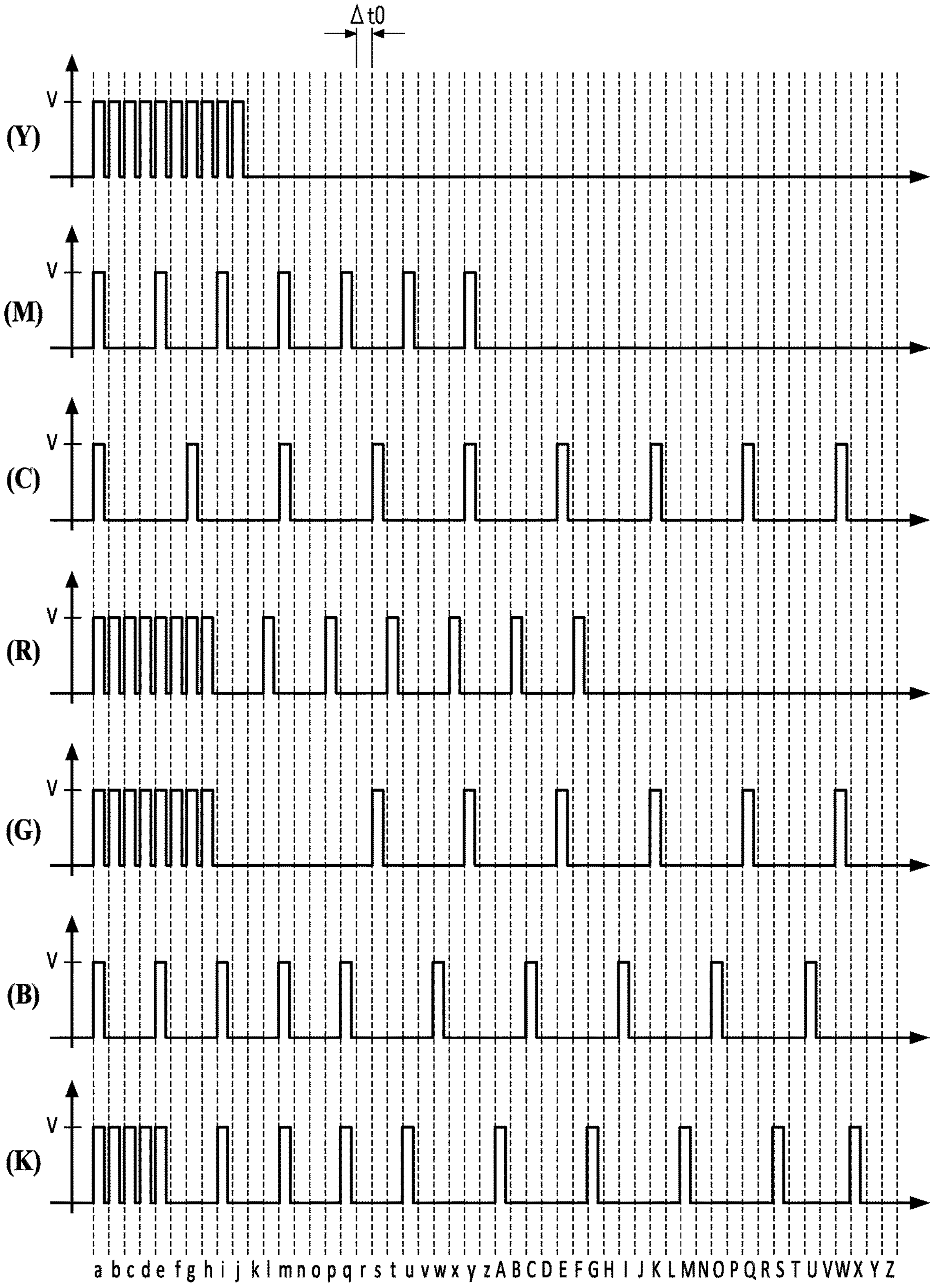
FIG. 7 is a diagram showing an example of heating pulses in the first embodiment.

FIG. 7 is a diagram showing heating signals to apply voltage to one heat-generating element 34 of the printing head in order to perform color development of one pixel in the print medium 10. FIG. 7 shows heating signals for developing colors in the respective pixels of yellow (Y), magenta (M), cyan (C), red (R), green (G), blue (B), and black (K). Each heating signal is composed of a pulse signal sequence containing a plurality of heating pulse signals (voltage pulses). Note that in FIG. 7, the horizontal axis indicates time, and the vertical axis indicates the voltage of each heating signal.

In FIG. 7, a heating signal forming one pixel has times corresponding to 52 sections (a to Z sections), and a predetermined number of heating pulse signals are contained in the 52 sections. The pulse width (time) of one heating pulse signal is set in a time corresponding to one section. When the length of one section is considered as $\Delta t0$, time required for forming one pixel is $\Delta t0 \times 52$. That is, for color development of one pixel, a time corresponding to 52 cycles of heating pulses is used, and color development is controlled by a pulse signal sequence composed of a plurality of heating pulse signals contained in this time.

A heating pulse signal is changed to a voltage having two values of High and Low (ON and OFF). In the following description, a state where a heating pulse becomes High is referred to as Pulse ON, and a state where a heating pulse becomes Low is referred to as Pulse OFF. In a case where the voltage of a heating pulse signal is High, the heating by the heat-generating element 34 is performed, and in a case where the voltage of a heating pulse signal is Low, the heating by the heat-generating element 34 is not performed. Hence, the color developments in the print medium 10 are controlled by controlling the number of Pulse ONs contained in heating signals for the respective colors. Note that in the present embodiment, all the heating pulse signals applied to sections a to Z have the same pulse width and the same voltage.

In a case where the color development layer of yellow (Y) is activated (the color is developed) in the print medium 10, it is necessary to perform heating which satisfies the color developing condition shown by the region 21 of FIG. 2. Hence, a heating pulse is generated in each of section a to section j. That is, Pulse ONs and Pulse OFFs are repeatedly generated in section a to section j. In addition, in a case where magenta (M) is developed, it is necessary to satisfy the color developing condition shown by the region 22 shown in FIG. 2, and hence, Pulse ONs and Pulse OFFs are repeatedly generated in section a to section y. Similarly, in a case where cyan (C) is developed, Pulse ONs and Pulse OFFs are repeatedly generated in section a to section W in order to satisfy the color developing condition of the region 23 shown in FIG. 2. In this way, by interposing Pulse OFFs during the periods of Pulse ONs, it is possible to suppress an increase in the temperature of the print medium 10 to the target temperature or more. That is, it is possible to maintain the target temperature by controlling the time of Pulse ONs and the time of Pulse OFFs. Note that although in the present embodiment, the cycles of Pulse ONs are constant, it is also possible to make the cycles of Pulse ONs different.

To sum up the above, relations between sections a to Z shown in FIG. 7 and heating times t1 to t3 and heating temperatures Ta1 to Ta3 shown in FIG. 2 are as follows.

Specifically, heating times necessary for exceeding activation temperatures shown in FIG. 2 are t2>the heating time of Y (section a to section j)>t1 t3>the heating time of M (section a to section y)>t2 the heating time of C (section a to section W)>t3.

Hence, a relative relation among the respective heating times required for color developments of Y, M, and C is the heating time of Y<the heating time of M<the heating time of C.

Note that as described above, the color developments of Y, M, and C occur in the first to third image formation layers 14, 16, and 18, respectively.

The heating energy (heat amount) applied to the print medium 10 by the printing head 30 is thermally conducted to the glaze 32 (and the convex glaze 33), the base 31, the heat sink 35, and the like of the printing head 30 shown in FIG. 3 during an interval time (Pulse OFF time) in each heating signal. Moreover, the heat amount thermally conducted into the print medium 10 also propagates to the periphery of the platen 43 and the like shown in FIG. 4. For this reason, the temperature of the print medium 10 decreases during an interval time. As a result, in a case where the heating energy (heat amount) applied to the print medium 10 is the same, the peak temperatures in the respective image formation layers 14, 16, and 18 are the first image formation layer 14>the second image formation layer 16>the third image formation layer 18.

Hence, in order to cause each image formation layer 14, 16, or 18 to develop the color, it is necessary to control the printing head 30 such that the peak temperature of each image formation layer satisfies the following relations.

the peak temperature of the image formation layer 14 (Y)>Ta3

Ta3>the peak temperature of the second image formation layer 16 (M)>Ta2

Ta2>the peak temperature of the third image formation layer 18 (C)>Ta1

By controlling the printing head 30 such that the peak temperature of each image formation layer satisfies the above-described relations, it is possible to independently develop the colors of Y, M, and C, respectively.

Next, heating pulse signals for forming a pixel of an N-th order color are described. Here, the N-th order color means a color obtained by combining N different colors. In the present embodiment, a pixel of a secondary color or a tertiary color is formed by causing two layers or three layers out of the first, second, and third image formation layers 14, 16, and 18 included in the print medium 10 to develop the colors in the same pixel position. The secondary color formed in the present embodiment is red (R), green (G), or blue (B), and the tertiary color is black (K).

In a case where a pixel of red (R) is formed, a heating pulse signal sequence shown in (R) in FIG. 7 is applied to the heat-generating element 34. In this way, yellow (Y) and magenta (M) are developed in this order, so that a pixel of red (R), which is a secondary color, can be formed.

In addition, in a case where a pixel of green (G) is formed, a heating pulse signal sequence shown in (G) in FIG. 7 is applied to the heat-generating element 34 to develop yellow (Y) and cyan (C) in this order. Similarly, in a case where a pixel of blue (B) shown in FIG. 7 is formed, a heating pulse signal sequence shown in (B) in FIG. 7 is applied to the heat-generating element 34 to develop magenta (M) and cyan (C) in this order. In addition, in a case where a pixel of black (K) shown in FIG. 7 is formed, a heating pulse signal sequence shown in (K) in FIG. 7 is applied to the heat-generating element 34 to develop yellow (Y), magenta (M), and cyan (C) in this order. In this way, a pixel of black (K) in which three colors are combined is formed.

<Flow of Calculating Uneven Density Correction Value>

Figure 8:
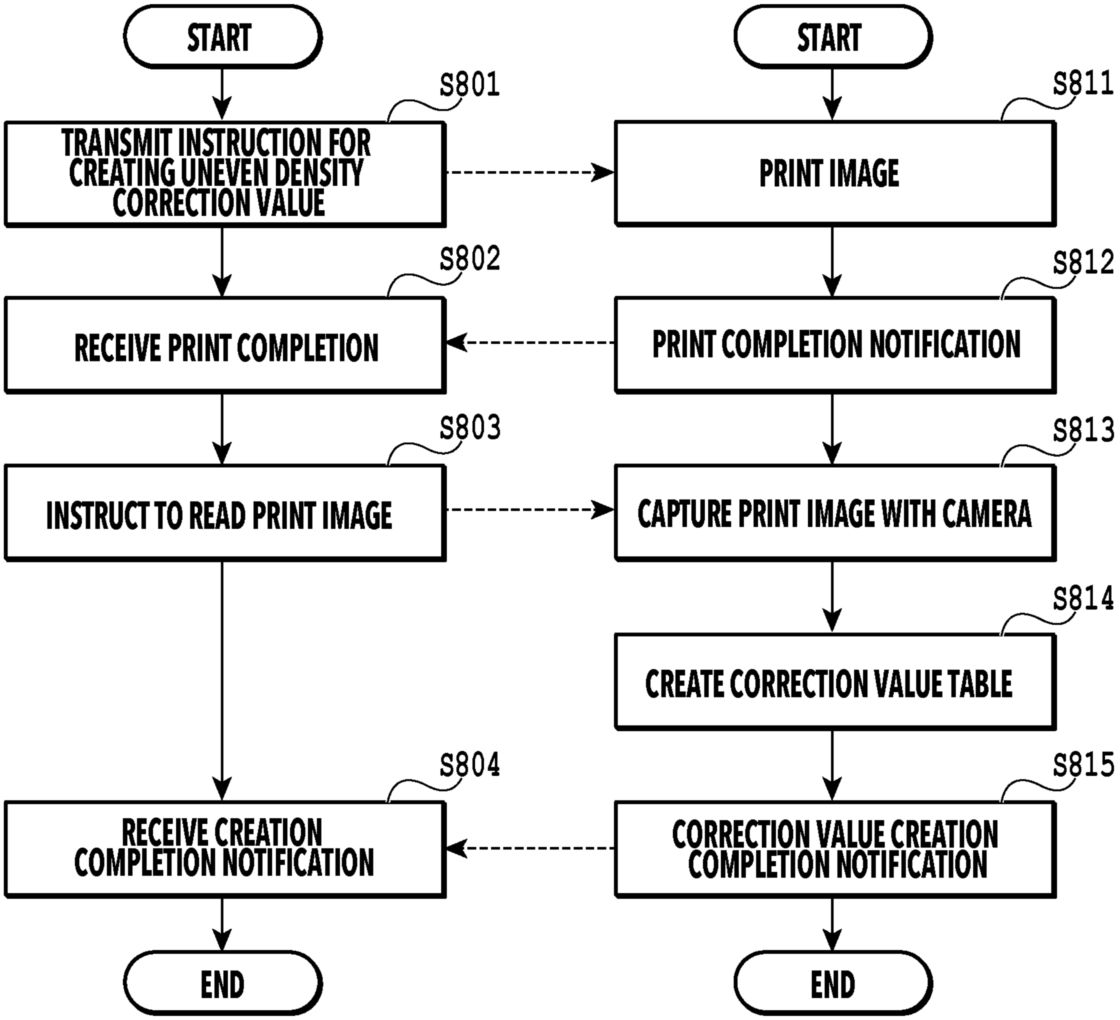
FIG. 8 is a flowchart showing processing of creating an uneven density correction value.

FIG. 8 is a flowchart showing a flow of processing of calculating an uneven density correction value according to the present embodiment, in which dashed arrows indicate transmission and reception of data. In FIG. 8, processes of S801 to 804 are executed in the smartphone 50, and processes of S811 to S815 are executed in the printing apparatus 40. These processes are performed by the CPUs provided in the respective apparatuses. Specifically, in the smartphone 50, which is the host apparatus, the CPU 501 performs the processes of S801 to S804 by reading and executing programs held in the HDD 503 and the RAM 502. In addition, in the printing apparatus 40, the CPU 401 performs the processes of S811 to S815 by reading and executing programs held in the ROM 403 and the RAM 402.

When an instruction for correcting an uneven density is inputted by the user, the smartphone 50 transmits an instruction for creating an uneven density correction value to the printing apparatus 40 in S801. Upon receipt of the instruction for correcting an uneven density from the smartphone 50, the printing apparatus 40 forms an image for detecting the heat-generating characteristics of the heat-generating elements 34 on the print medium 10 (S811). This image for detecting the heat-generating characteristics of the heat-generating elements 34 is an image for detecting variations in the heat-generating characteristics of the plurality of heat-generating elements 34 provided in the printing head 30, and its image data is held in the ROM 403 of the printing apparatus 40. Hereinafter, this image is referred to as a detection image, and image data representing the detection image is referred to as detection image data. This detection image is described later with reference to FIGS. 9A and 9B. Upon completion of the print processing of printing a detection image, the printing apparatus 40 transmits a print completion notification to the smartphone 50 (S812), and enters the standby state.

Note that although an example in which in S811, the printing apparatus 40 reads and prints detection image data held in the ROM 403 has been described, the configuration is not limited to this. A configuration is also possible in which detection image data held in the HDD 503 of the smartphone 50 is transmitted to the printing apparatus 40, and the printing apparatus 40 prints the received detection image.

In S802, the smartphone 50 receives the print completion notification transmitted from the printing apparatus 40, and displays the received print completion notification on the display. Moreover, the smartphone 50 displays, on the display of the smartphone 50, a message instructing the user to capture the detection image formed in the print medium with the camera 46 of the printing apparatus 40 to prompt the user to capture the detection image (S803).

When the user presses the image-capturing button 47 of the printing apparatus 40 in accordance with the message displayed on the smartphone 50, the printing apparatus captures the detection image formed on the print medium 10 with the camera 46 (S813). Thereafter, in S814, the CPU 401 of the printing apparatus 40 analyzes the detection image captured with the camera 46, and calculates uneven density correction values to create a correction table for correcting an uneven density. The uneven density correction table thus created is held in the RAM 402. Note that the details of the processing of calculating the uneven density correction values and creating the correction table are described later. Thereafter, the printing apparatus 40 transmits correction table creation completion notification to the smartphone 50, and enters the standby state (S815).

In S804, the smartphone 50 displays the correction table creation completion notification received from the printing apparatus 40 on the display of the smartphone. From this display, the user recognizes that it has become possible to print an image in which uneven density has been corrected. In this way, the uneven density correction value and correction table creation processing is completed.

Note that in the above-described flowchart, an example in which the detection image is captured with the camera 46 of the printing apparatus 40, and the uneven density correction value is calculated by the CPU (correcting unit) 401 of the printing apparatus is presented. However, it is also possible to perform the processes of the capturing of the detection image, the calculation of the uneven density correction value, and the like on the smartphone 50 side. For example, it is possible to capture a detection image with the camera 507 of the smartphone 50, transfer an uneven density correction value calculated by the CPU 501 of the smartphone 50 to the printing apparatus 40, and cause the printing apparatus 40 to create a correction table based on the received correction value, and hold the correction table in the RAM 402.

<Detection Image>

Next, a detection image formed in the present embodiment is described. FIG. 9A is a partially enlarged view showing an example of a detection image 1001 printed on the print medium 10. In FIG. 9A, the y direction indicates the conveyance direction of the print medium (the width direction of the print medium), and the x direction is a direction orthogonal to the conveyance direction of the print medium 10. The plurality of heat-generating elements 34 of the printing head 30 which performs printing on the print medium 10 are arrayed along the x direction.

The detection image 1001 shown in FIG. 9A is an image printed for detecting the heat-generating characteristics of the heat-generating elements 34, and includes marks 1002, a preheating region 1003, and an analysis region 1004.

The plurality of marks 1002 are printed at predetermined intervals along the width direction (x direction) of the print medium. This plurality of marks 1002 are images used for specifying the positions of the heat-generating elements 34. The plurality of marks 1002 are preferably formed by developing mainly the color of the first image formation layer 14, which develops the color in the shortest heating time. These marks make it possible to associate the heat-generating elements 34 with the detection image at a high precision in reading the printed detection image.

The preheating region 1003 is a region printed for heating the heat-generating elements 34 to stabilize the temperature. In this preheating region 1003, high-density yellow (Y), that is, (R, G, B), (255, 255, 0) is printed.

The analysis region 1004 is a region printed for analyzing the characteristics of the heat-generating elements 34, and high-density yellow (Y), that is, (R, G, B), (255, 255, 0) is printed. That is, mainly the first image formation layer 14 is caused to develop the color. As described above, the heating time for developing the color of the first image formation layer 14 is t2>the heating time of Y (section a to section j)>t1, and is the shortest heating time required for developing the color among the three image formation layers 14, 16, and 18 in the print medium 10. The printing is performed by heating the heat-generating elements 34 in such a manner as to develop the color of mainly this first image formation layer 14. Note that in the formation of the analysis region 1004, it is only necessary that the main color development layer is the image formation layer 14, and the color development region is larger than the second and third image formation regions.

In this way, by using the first image formation layer 14 as the main color development layer to shorten the heating time, it is possible to suppress propagation of the heat from adjacent pixels in the print medium. In addition, since the color development of the other image formation layers 16 and 18 is suppressed and the analysis region 1004 is formed with a single color (high-density yellow), it is possible to suppress a change in density of the analysis region 1004 due to variations in color development of the other image formation layers 16 and 18, and the like. Hence, it is possible to form pixels in accordance with the heat-generating characteristics of the respective heat-generating elements 34, and to thus detect the heat-generating characteristic of each heat-generating element 34 at a high precision based on the formed analysis region 1004.

Note that in the detection image shown in FIG. 9A, which is described above, an example in which the analysis region 1004 of one gradation is formed on the print medium 10; however, the analysis region 1004 may be formed corresponding to each of a plurality of gradations.

<Uneven Density Correction Value>

In order to suppress uneven density of an image formed on a print medium, in the present embodiment, an uneven density correction value for correcting print data is created as follows. First, the aforementioned detection image 1001 formed on the print medium 10 is captured with the camera 46, and the heat-generating characteristic of each of the plurality of heat-generating elements 34 is detected. Subsequently, 1D_LUT (one-dimensional look-up table) for correcting the print data of each color (c, m, and y data) is created based on the detected heat-generating characteristic of each heat-generating element 34 and a color development heating characteristic of each of the image formation layers 14, 16, and 18 held in the ROM 403 in advance. Here, the color development heating characteristic means a relation between the heating time and the heating temperature shown in FIG. 2, or a heating pulse signal, or the like.

Here, the method for creating a correction table is specifically described.

It is assumed that print data of each of cyan (C), magenta (M), and yellow (Y) (hereinafter, referred to as c data, m data, and y data) is 256-gradation data taking "0" to "255" gradation values. In this case, a density value at which the third image formation layer 18 of the print medium 10 would develop the color in a case where a reference heating pulse signal corresponding to gradation "1" of the c data is applied to the heat-generating element 34 having the detected heat-generating characteristic to heat the print medium 10, that is, the density value of cyan (C) is calculated. Then, a correction value for converting the heating pulse signal corresponding to gradation value "1" to a heating pulse signal which allows a target density value to be obtained is created, based on the detected density value and the density value (target density value) defined with the gradation value "1". That is, in a case where the detected density value is different from the target density value, the reference heating pulse signal and the heating pulse signal after correction are associated with each other for converting a reference heating pulse signal defined in advance as the heating pulse signal corresponding to gradation value "1" to the heating pulse signal (heating pulse signal after correction) which allows the target density value to be obtained.

Next, for gradation value "2" as well, a density value at which the color would be developed in a case where a reference pulse signal corresponding to gradation value "2" is applied is calculated, and association for conversion to a heating pulse signal which allows the target density value to be obtained is performed based on the calculated density value and the target density value in the same manner. Then, the above-described association is performed up to gradation value "255" in the same manner.

Moreover, for m data and y data as well, the above-described association is performed for each of gradation values "0" to "255" in the same manner, The association between the reference heating pulse signal and the heating pulse signal after correction, obtained for each gradation value as described above, is collected as a one-dimensional look-up table, which is held in the ROM for each heat-generating element 43 as 1D_LUT_C for correcting the c data, 1D_LUT_M for correcting the m data, and 1D_LUT_Y for correcting the y data.

By using this 1D_LUT, it is possible to properly correct the c data, the m data, and the y data for each gradation, and to thus apply a desired heating energy to the print medium 10.

Note that the target density used in calculating the uneven density correction value may be set to a density printed by the heat-generating element 34 with the applied voltage close to a central value among the plurality of heat-generating elements 34, or may be set to a density in a case where the density is printed by the heat-generating element 34 with the lowest applied voltage. In addition, for the N-th order color, which is a combination of yellow (Y), magenta (M), and cyan (C), the uneven density correction value for each of yellow (Y), magenta (M), and cyan (C) is applied.

Figure 10:
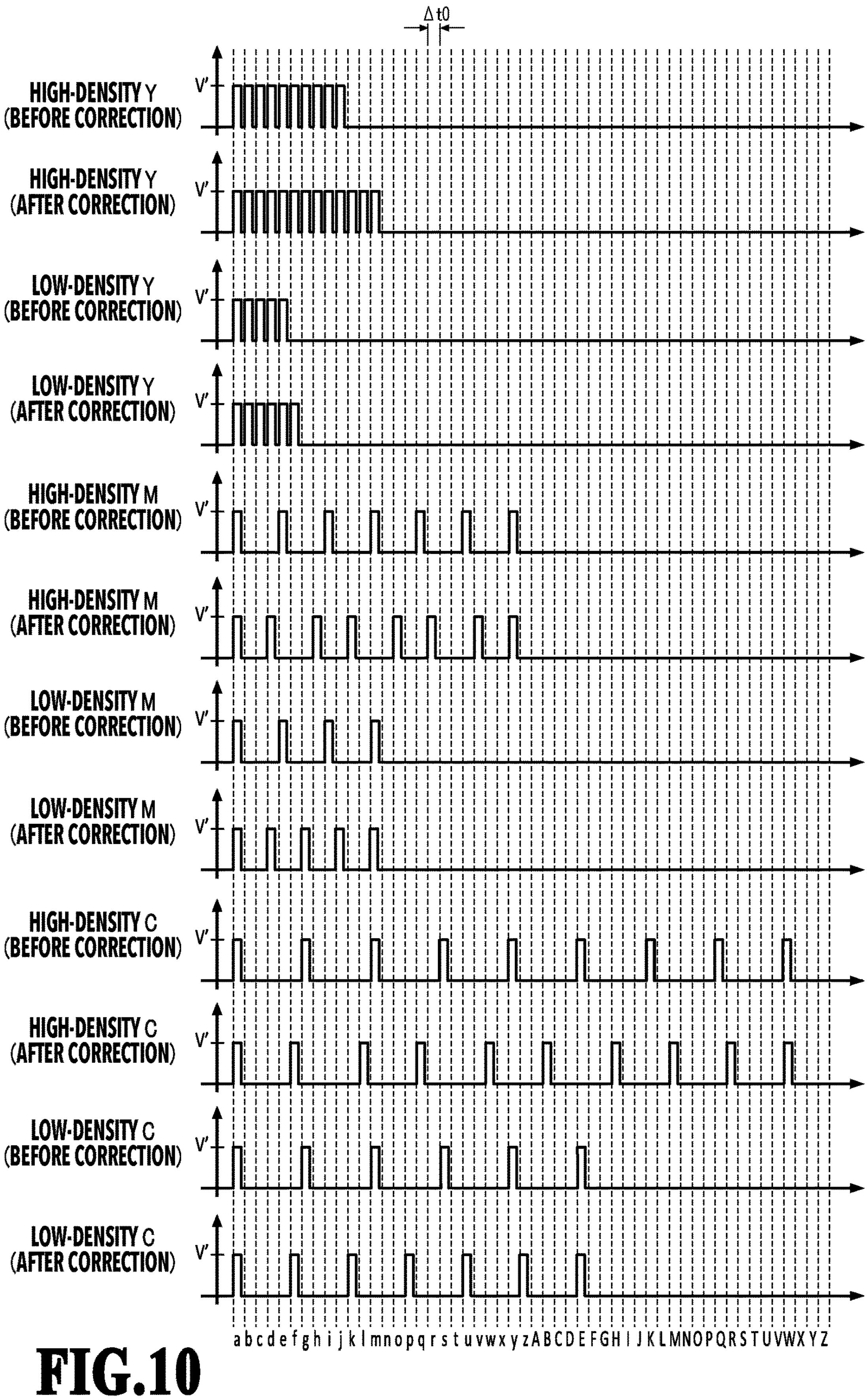
FIG. 10 is a diagram showing heating pulses before correction and after correction in the first embodiment.

FIG. 10 is a diagram showing an example in which a heating pulse signal after correction (second heating signal) is generated by adjusting the number of Pulse ONs of the heating pulse signal (first heating signal) before correction, which corresponds to the heat-generating element 34 with a low applied voltage by using the uneven density correction value. FIG. 10 shows an example of a configuration of the heating pulse signal corresponding to the color to be developed in one pixel of the print medium 10 as in the case of FIG. 7. The voltage to be applied to the heat-generating elements is V', and satisfies a relation $V'<V$. Here, as an example, it is assumed that $V/V'$=about 1.1.

FIG. 10 shows a heating pulse signal for a high density and a heating pulse signal for a low-density as representative examples of the heating pulse signals for each color. That is, from the upper side of FIG. 10,

- The heating pulse signal (first heating signal) before the uneven density correction of high-density yellow (Y)
- The heating pulse signal (second heating signal) after the uneven density correction of high-density yellow (Y)
- The heating pulse signal (first heating signal) before the uneven density correction of low-density yellow (Y)
- The heating pulse signal (second heating signal) after the uneven density correction of low-density yellow (Y)
- The heating pulse signal (first heating signal) before the uneven density correction of high-density magenta (M)
- The heating pulse signal (second heating signal) after the uneven density correction of high-density magenta (M)
- The heating pulse signal (first heating signal) before the uneven density correction of low-density magenta (M)

The heating pulse signal (second heating signal) after the uneven density correction of low-density magenta (M)
The heating pulse signal (first heating signal) before the uneven density correction of high-density cyan (C)
The heating pulse signal (second heating signal) after the uneven density correction of high-density cyan (C)
The heating pulse signal (first heating signal) before the uneven density correction of low-density cyan (C)
The heating pulse signal (second heating signal) after the uneven density correction of low-density cyan (C)

are shown in this order.

The heating pulse signal before the uneven density correction of high-density yellow (Y) shown in FIG. 10 has a voltage lower than that of the heating pulse signal of yellow (Y) shown in FIG. 7. Hence, although the heating pulse signal shown in FIG. 10 is the same as the heating pulse signal shown in FIG. 7 in the number of Pulse ONs, but has a thinner image density on the print medium 10. For this reason, the heating pulse signal after the uneven density correction of high-density yellow (Y) shown in FIG. 10 has the number of Pulse ONs increased to obtain substantially the same density as that of the heating pulse signal of yellow (Y) shown in FIG. 7.

Similarly, since the heating pulse signal before the uneven density correction of high-density magenta (M) shown in FIG. 10 has a voltage lower than that of the heating pulse signal of magenta (M) shown in FIG. 7, although the number of Pulse ONs is the same, the image density on the print medium 10 is thinner. Hence, the heating pulse signal after the uneven density correction of high-density magenta (M) shown in FIG. 10 has the number of Pulse ONs increased to obtain substantially the same density as that of the heating pulse signal of magenta (M) shown in FIG. 7.

Moreover, since the heating pulse signal before the uneven density correction of high-density cyan (C) shown in FIG. 10 has a voltage lower than that of the heating pulse signal of cyan shown in FIG. 7, although the number of Pulse ONs is the same, the image density on the print medium 10 is thinner. Hence, the heating pulse signal after the uneven density correction of high-density cyan (C) shown in FIG. 10 has the number of Pulse ONs increased to obtain substantially the same density as that of the heating pulse signal of cyan (C) shown in FIG. 7.

In addition, as shown in FIG. 10, for the heating pulse signal of yellow (Y), the intervals of the Pulse ONs are denser than those of magenta (M) or cyan (C). Hence, in section a to section j, it is impossible to increase the number of Pulse ONs to obtain substantially the same density as that of the heating pulse signal shown in FIG. 7. That is, it is impossible to obtain a required heat flux in the heating time of section a to section j. Hence, in the example shown in FIG. 10, a correction of enhancing the print density by widening sections like section a to section m to increase the number of Pulse ONs is performed.

On the other hand, for magenta (M) and cyan (C), wide pulse intervals exist among the Pulse ONs, the correction of increasing the heat flux by increasing the number of Pulse ONs in the same sections (heating time) as those for the heating pulse signal shown in FIG. 7 is performed. This makes it possible to perform printing with substantially the same density as that of the heating pulse signal shown in FIG. 7 for magenta (M) and cyan (C) as well.

In addition, in the example shown in FIG. 10, in yellow (Y), the number of Pulse ONs in the heating pulse signal before the uneven density correction of high-density yellow (Y) is 10, and the number of Pulse ONs in the heating pulse signal after the uneven density correction is 13. That is, the number of Pulse ONs after the correction is increased to 1.3 times the number of Pulse ONs before the correction. On the other hand, the ratio of a decrease in the voltage V' to the voltage V is about 1.1, so that the ratio of an increase in the number of Pulse ONs is made larger than the ratio of a decrease in the voltage.

In addition, in magenta (M), the number of Pulse ONs of the heating pulse signal before the uneven density correction of high-density magenta (M) is 7, and the number of Pulse ONs of the heating pulse signal after the uneven density correction of high-density magenta (M) is 8. That is, the ratio of an increase in the number of Pulse ONs due to the correction is 1.1, and this is substantially the same as the ratio (about 1.1) of a decrease in the voltage V' to the voltage V.

Similarly, in cyan (C), the number of Pulse ONs of the heating pulse signal before the uneven density correction of high-density cyan (C) is 9, and the number of Pulse ONs of the heating pulse signal after the uneven density correction of high-density cyan (C) is 11, and the ratio of an increase in the number of Pulse ONs by the correction is 1.1. Hence, in cyan (C) as well, the ratio of an increase in the number of Pulse ONs by the correction and the ratio (about 1.1) of a decrease in the voltage V' to the voltage V is substantially the same.

In this way, yellow (Y) for which the number of Pulse ONs cannot be increased in the same heating time as that of the heating pulse signal before correction has a larger ratio of change in the number of Pulse ONs (i.e. heating energy) than those of magenta (M) and cyan (C).

In addition, the number of Pulse ONs of the heating pulse signal before the uneven density correction of low-density yellow (Y) is 5, and the number of Pulse ONs of the heating pulse signal after the uneven density correction of low-density yellow (Y) is 6, and the ratio of an increase in the number of Pulse ONs by the correction is 1.2. That is, the ratio of change (uneven density correction value) in the number of Pulse ONs by the correction is larger in high-density yellow (Y) than in low-density yellow (Y).

Figure 9B:
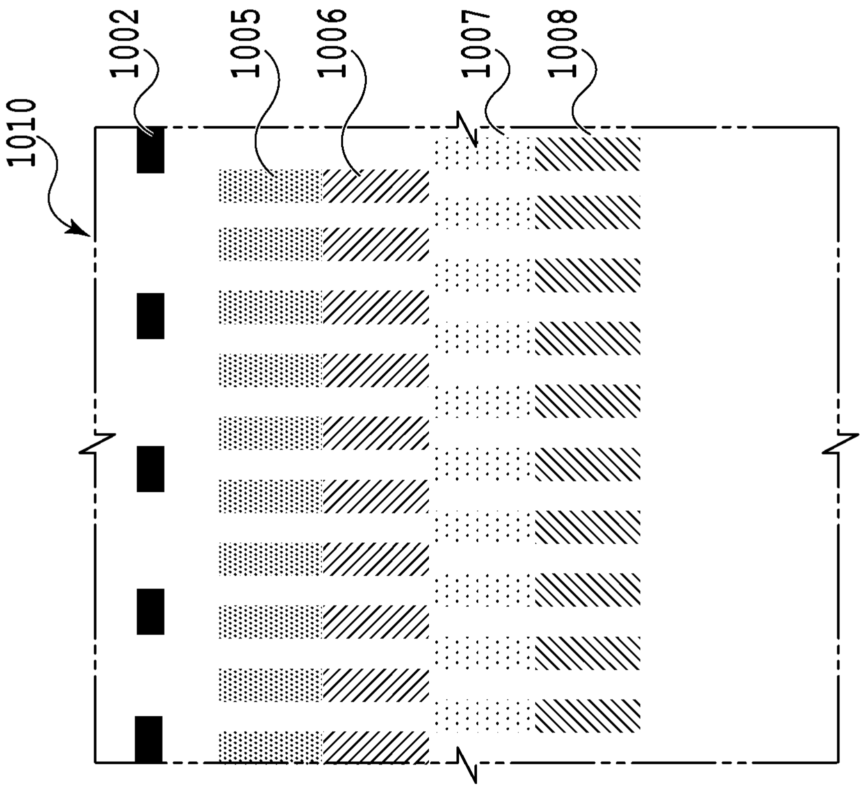
FIGS. 9A and 9B are partially enlarged views showing an example of a detection image in the first embodiment.
Figure 9A:
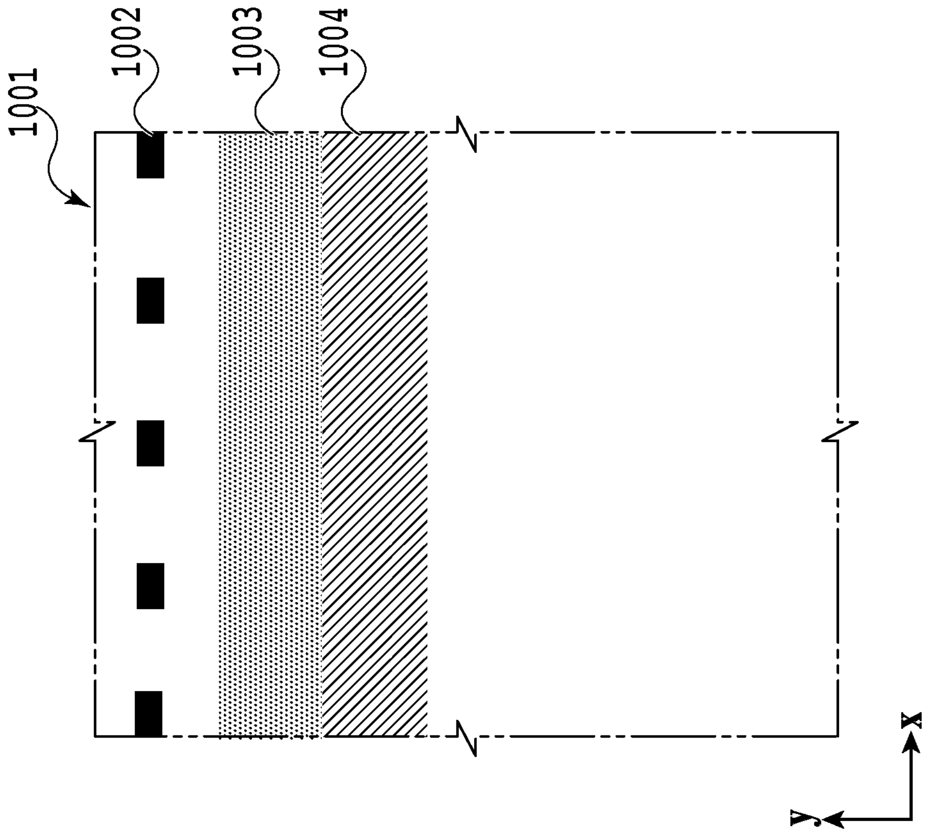

FIG. 9B is a partially enlarged view showing another example of a detection image for detecting the heat-generating characteristic of each heat-generating element 34. A detection image 1010 shown in FIG. 9B is such that regions (first regions) for detecting the heat-generating characteristics of heat-generating elements (first heat-generating elements) 34 of odd numbers and regions (second regions) for detecting the heat-generating characteristics of heat-generating elements (second heat-generating elements) 34 of even numbers, in a heat-generating element row composed of a plurality of heat-generating elements 34, are separately printed.

Specifically, in the detection image 1010, preheating regions 1005 for heating the heat-generating elements 34 of odd number to stabilize the temperature and analysis regions 1006 for analyzing the characteristics of the heat-generating elements 34 of odd numbers are printed. All these regions are printed with high-density yellow (Y) (R, G, B), (255, 255, 0). Moreover, in the detection image 1010, preheating regions 1007 for heating the heat-generating elements 34 of even numbers to stabilize the temperature and analysis regions 1008 for analyzing the characteristics of the heat-generating elements 34 of even numbers are printed. These regions are also printed with high-density yellow (Y) (R, G, B), (255, 255, 0).

In the detection image 1010, the printing is performed without heating adjacent ones of the heat-generating elements 34. For this reason, each region can be formed without being affected by heat from the adjacent heat-generating elements 34, so that analysis regions precisely reflecting the heat-generating characteristics of the individual heat-generating elements 34 can be formed. Hence, by reading this detection image 1010, it is possible to detect the heat-generating characteristic of each heat-generating element 34 at a high precision.

Note that in the printing head 30, each of the plurality of heat-generating elements 34 arrayed along the x direction only has to have the same interval (array pitch) to an adjacent heat-generating element in the x direction, and the positions of the heat-generating elements in the y direction are not particularly limited. That is, the positions of the heat-generating elements in the y direction may be aligned on the same straight line, or may be different positions. In the present embodiment, the heat-generating elements of odd numbers and the heat-generating elements of even numbers are arranged in a staggered pattern. Hence, two heat-generating element rows extending in the x direction, that is, the heat-generating element row composed of the heat-generating elements of odd numbers and the heat-generating element row composed of the heat-generating elements of even numbers are formed, and one line extending in the x direction is formed by these heat-generating element rows. In addition, the heat-generating element row of odd numbers and the heat-generating element rows of even numbers each may be further divided into two lines to form one line with four heat-generating element rows in total.

<Image Processing>

Figure 11:
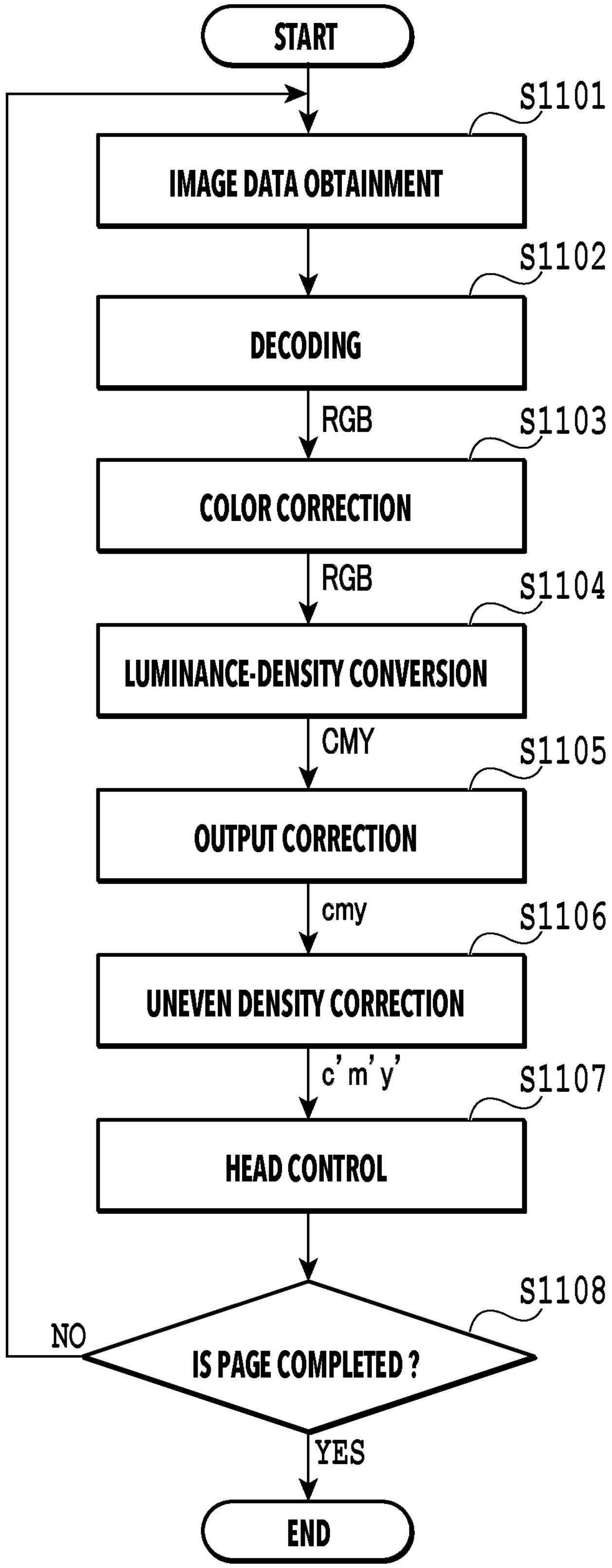
FIG. 11 is a flowchart showing image forming processing in the first embodiment.

FIG. 11 is a flowchart showing a flow of image processing performed in the present embodiment. The process executed in each step in FIG. 11 is executed in step S615 of the flowchart of FIG. 6. The processes shown in FIG. 11 are implemented, for example, by the CPU 401 of the printing apparatus 40 reading and executing programs and data contained in the ROM 403 or the like. That is, in the present embodiment, the CPU 401 functions as a generating unit configured to generate heating signals, which are print data. Note that it is also possible to execute some of the functions shown in FIG. 11 with ASIC such as the image processing accelerator 407.

In S1101, the CPU 401 obtains image data in the print job received in S614 of FIG. 6. Here, description is made on the assumption that image data is obtained page by page.

In S1102, the CPU 401 performs a decoding process on the compressed or encoded image data. Note that in a case where image data is not compressed or encoded, the present process is omitted. The image data is converted to RGB data by the decoding process. The type of the RGB data includes, for example, standard image data such as sRGB and adobe (registered trademark) RGB. The image data in the present embodiment contains 8-bit information for each color, and has a value region of "0" to "255", but may be image data composed of 16-bit information or information of another number of bits.

In S1103, the CPU 401 performs a color correcting process on the image data. Note that it is also possible to perform the color correcting process in the smartphone 50 side. However, in a case where color correction dedicated to the printing apparatus 40 is performed, it is preferable to perform the color correction in the printing apparatus 40 as in the present example. The image data after the color correcting process is RGB data, but is assumed to take the form of RGB specialized for the printing apparatus 40, that is, device RGB at this time.

In S1104, the CPU 401 performs luminance-density conversion on the image data by using a three-dimensional look-up table. In a general thermal printing apparatus, for example, the following conversion is performed by using RGB data of image data.

C=255-R

M=255-G

Y=255-B

On the other hand, in the case of the pulse control according to the present embodiment, for example, the control parameter of magenta in a case where magenta (M) is formed of a single color and the control parameter of magenta forming red (R), which is a secondary color, are different. Hence, in order to separately set these, it is preferable to perform luminance-density conversion using a three-dimensional look-up table shown below.

In the present embodiment, the luminance-density conversion is performed by using the three-dimensional look-up table shown below. In the function 3D_LUT[R][G][B][N] of the three-dimensional look-up table shown below, in variables R, G, and B, values of RGB data are respectively inputted, and to the variable N, any of C, M, and Y to be outputted is designated. It is assumed here that 0, 1, and 2 are designated as C, M, and Y.

C=3D_LUT[R][G][B][0]

M=3D_LUT[R][G][B][1]

Y=3D_LUT[R][G][B][2]

The above-described 3D_LUT is composed of 50331648 data tables of 256×256×256×3. Each data is data corresponding to the width of a pulse to be applied at each of section a to section Z shown in FIG. 7. Note that to reduce the data amount of the look-up table, for example, it is possible to reduce the number of grids from 256 to 17 to use 14739 data tables of 17×17×17×3, and to calculate values between grids through interpolation operation. In addition, besides 17 grids, it is possible to set another suitable number of grids such as 16 grids, 9 grids, and 8 grids. As the interpolation method, a known method such as tetrahedral interpolation may be used. In the present embodiment, the three-dimensional look-up table is specified in advance, and is held in the ROM 403 or the like of the printing apparatus 40.

By using the above-described three-dimensional look-up table, it is possible to separately set the control parameter of each of yellow (Y), magenta (M), and cyan (C) forming each printing color. That is, it is possible to independently set control parameters for yellow (Y) and magenta (M) forming red (R), which is a secondary color, cyan (C) and yellow (Y) forming green (G), and magenta (M) and cyan (C) forming blue (B). Similarly, it is also possible to independently set control parameters for yellow (Y), magenta (M), and cyan (C) forming black (K). This makes it possible to more finely control color development, which contributes to an improvement in color reproducibility.

In S1105, the CPU 401 performs output correction on the converted image data. First, the CPU 401 indicates the number of ONs of the heating pulse signal and intervals between Pulse ONs corresponding to the values of C, M, and Y by using the conversion table corresponding to each printing color. It is assumed that this conversion table (conversion equation) is specified in advance, and held in the ROM 403 or the like of the printing apparatus 40.

c=1D_LUT[C]

m=1D_LUT[M]

y=1D_LUT[Y]

By correcting the number of Pulse ONs and the intervals between Pulse ONs represented by c, m, and y, it is possible to modulate the color development intensity in the print medium 10, and to thus achieve a density corresponding to a desired gradation.

Moreover, the CPU 401 modulates the heating pulses in accordance with the temperature of the print medium 10 or the printing head 30, which is obtained by the temperature sensor 45. Specifically, the CPU 401 performs control to reduce the number of Pulse ONs of the heating pulses used for making the temperature reach activation temperature as the temperature detected by the temperature sensor 45 becomes higher. This process may be performed by using known device. In addition, it is also possible to obtain the temperature of the print medium 10 without using the temperature sensor 45. For example, it is also possible to obtain the temperature of the print medium 10 by estimating the temperature of the print medium 10 or the printing head 30 in the smartphone 50 or the printing apparatus 40, and the number of Pulse ONs of the heating pulse signal may be controlled based on the estimated temperature thus obtained. This method for estimating the temperature is not particularly limited, and a known method can be used.

In S1106, the CPU 401 performs a process as a deriving unit configured to converts (derives) c, m, and y data generated in S1105 to c', m', and y' data as uneven density correction values by using a conversion table described below which is created for each heat-generating element 34. That is, the CPU 401 converts (derives) the number of Pulse ONs and the intervals between the Pulse ONs represented by c, m, y data to the number of Pulse ONs and the intervals between the Pulse ONs represented by c', m', y' data.

c'=1D_LUT_C[c]

m'=1D_LUT_M[m]

y'=1D_LUT_Y[y]

Thereafter, in S1107, the CPU 401 controls the printing head 30 through the head controller 405 based on the number of Pulse ONs and the intervals between Pulse ONs derived by referring to the above-described conversion table. In this even, the heating pulse signal of each of yellow (Y), magenta (M), and cyan (C) with the uneven density controlled based on the correction value is applied to each heat-generating element 34, and each pixel region of the print medium 10 is heated. In this way, desired colors can be developed in the respective pixel regions on the print medium 10.

In S1108, the CPU 401 determines whether the printing for one page is completed. If the printing is completed (YES in S1108), the CPU 401 ends this process flow, and proceeds to the process for the next page, or to the process of S616 of FIG. 6. If the printing for one page is not completed (NO in S1108), the CPU 401 proceeds to S1101, and continues the image formation process for this page.

As described above, in the present embodiment, since the uneven density correction in accordance with the heat-generating characteristic of each heat-generating element 34 of the printing head 30 and the color development heating characteristic of each of the image formation layers 14, 16, and 18 of the print medium 10 is performed, it is possible to form a high-quality image on a print medium in which a plurality of image formation layers are laminated.

Second Embodiment

Next, a second embodiment of the present disclosure is described. Note that it is assumed that the present embodiment also includes the configuration shown in FIG. 3 to FIG. 5, and performs printing on the print medium 10 shown in FIG. 1, as in the case of the first embodiment. Hereinafter, points different from the first embodiment are mainly described.

Figure 12:
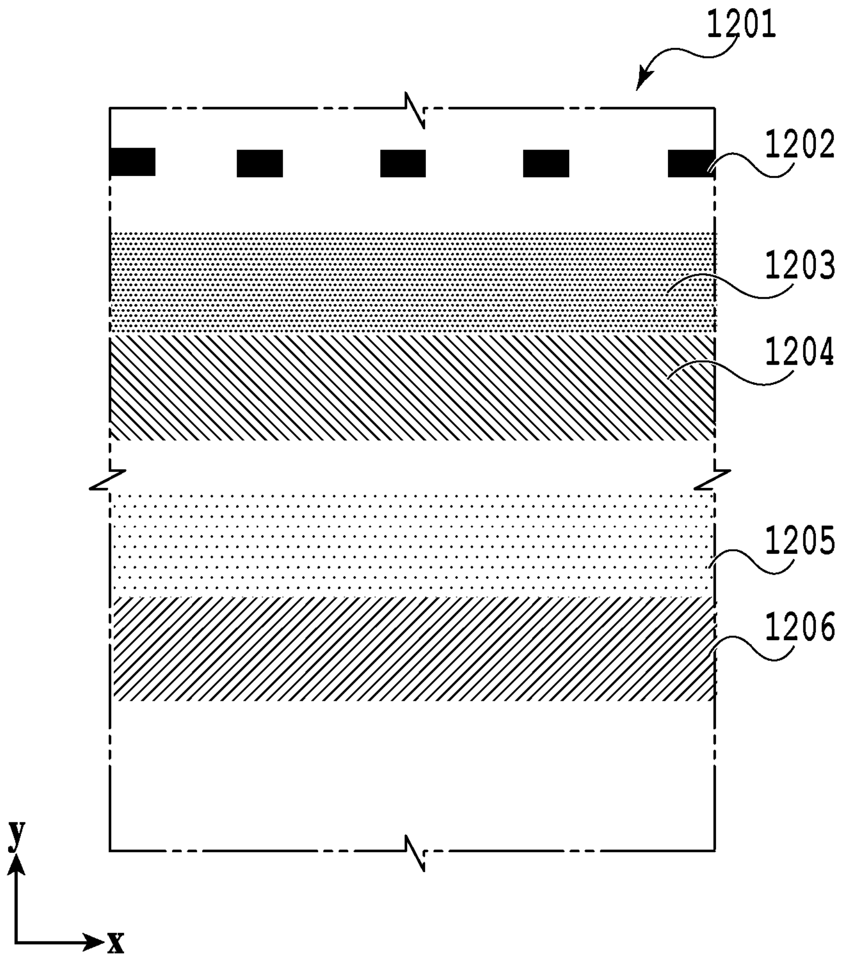
FIG. 12 is a partially enlarged view showing an example of a detection image in a second embodiment.

In the above-described first embodiment, the detection image 1001 including the preheating region 1005 and the analysis region 1004 of high-density yellow (Y) is formed by developing mainly the color of the first image formation layer 14 among the first, second, and third image formation layers 14, 16, and 18 included in the print medium 10. In contrast, in the present embodiment, a detection image 1201 as shown in FIG. 12 is formed. Specifically, besides marks 1202 and a preheating region 1203 and an analysis region 1204 of high-density yellow, a preheating region 1205 and an analysis region 1206 of high-density cyan (C) or high-density magenta (M) are formed.

The preheating region 1203 and the analysis region 1204 (third region) of high-density yellow (Y) are formed by developing the color of the first image formation layer 14 as in the case of the first embodiment. The heating pulse signal for developing high-density yellow (M) has dense intervals between Pulse ONs. For this reason, it is impossible to increase the number of Pulse ONs in the specified heating time (section a to section j). That is, since a necessary heat flux cannot be obtained depending on the heating time, the printing of high-density yellow is performed by extending the heating time like section a to section m and increasing the number of Pulse ONs.

On the other hand, the preheating region 1205 and the analysis region 1206 of high-density cyan (C) or high-density magenta (M) are formed by developing the color of the second image formation layer 16 or the third image formation layer 18. High-density magenta (M) is represented by (R, G, B), (255, 0, 255), and high-density cyan (C) is represented by (R, G, B)=(0, 255, 255). In the heating pulse signals for developing these colors, there are a wide pulse interval between adjacent Pulse ONs. For this reason, it is possible to increase the number of Pulse ONs to increase the heat flux in specified sections (heating time).

In view of this, in the present embodiment, the heat-generating characteristic of each heat-generating element is obtained by capturing and analyzing the images of the analysis region 1204 of yellow (Y) and the analysis region 1206 (fourth region) of cyan (C) or magenta (M). Then, a correction table (1D_LUT) for correcting print data of each color is created based on the heat-generating characteristics thus obtained.

Specifically, 1D_LUT for correcting y data is created based on the heat-generating characteristic of each heat-generating element 34 obtained by capturing and analyzing the image of the analysis region 1204 and the color development heating characteristic (heating pulse signal or the like) of the first image formation layer 14 held in the ROM 403 in advance.

In addition, 1D_LUT for correcting m data is created based on the heat-generating characteristic of each heat-generating element 34 obtained by capturing and analyzing the image of the analysis region 1206 and the color development heating characteristic (heating pulse signal or the like) of the second image formation layer 16 held in the ROM 403 in advance. Similarly, 1D_LUT for correcting c data is created based on the heat-generating characteristic of each heat-generating element 34 obtained by capturing and analyzing the image of the analysis region 1206 and the color development heating characteristic (heating pulse signal or the like) of the third image formation layer 18 held in the ROM 403 in advance. 1D_LUT thus created is held in the ROM 403.

As described above, in the present embodiment, 1D_LUT for cyan (C) and magenta (M) is created by using the heat-generating characteristic of each heat-generating element obtained from the analysis region of cyan (C) or magenta (M) developed in a specified heating time. This makes it possible to develop cyan and magenta in a print medium at a higher precision, and thus form a higher-quality image.

Note that since it is possible to perform correction to change a heat flux in a specified heating time with both the heating pulse signals for the second image formation layer 16 and the third image formation layer 18, the color with which to print the analysis region 1206 may be any of cyan (C) and magenta (M). However, since magenta (M) has a shorter heating time required for developing the color than that for cyan (C), it is more preferable to print the analysis region with magenta.

Third Embodiment

Next, a third embodiment of the present disclosure is described. It is assumed that the present embodiment also includes the configuration shown in FIG. 3 to FIG. 5, and performs printing on the print medium 10 shown in FIG. 1. Hereinafter, points different from the first embodiment are mainly described.

In the above-described embodiments, an example of correcting heating pulse signals as c, m, and y data is described, as shown in FIG. 8. In contrast, in the present embodiment, uneven density is corrected by correcting pixel values RGB.

Figure 13:
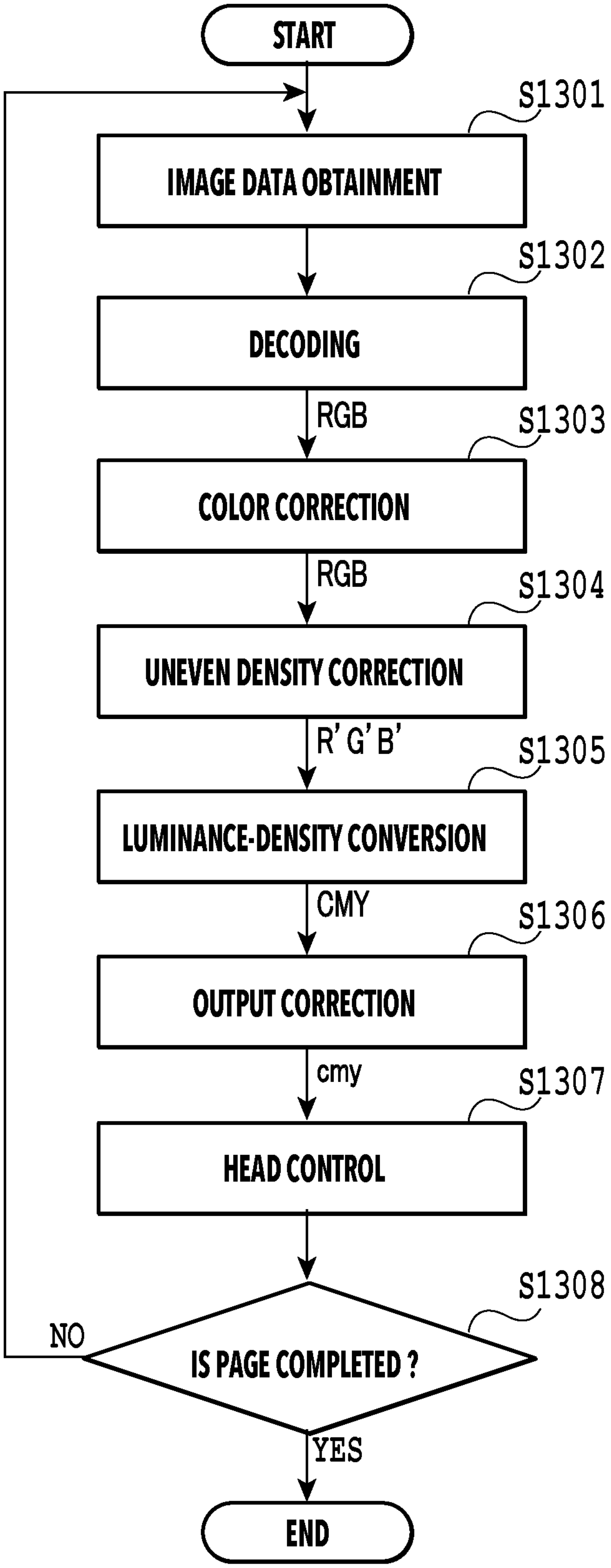
FIG. 13 is a flowchart showing image forming processing in a third embodiment.

Hereinafter, an image forming process performed in the present embodiment is described with reference to a flowchart of FIG. 13. Note that S1301 to S1303 and S1305 to S1308 shown in FIG. 13 are the same as S1101 to S1103, S1105, S1107, and S1108 shown in FIG. 11, descriptions in common with the first embodiment are omitted.

In the present embodiment as well, for the process of calculating the uneven density correction value, the heat-generating element 34 with the lowest applied voltage is used as a reference heat-generating element, as an example, and colors which would be developed are calculated from the heat-generating characteristic of the reference heat-generating element 34 and c, m, and y data to which the RGB data is converted in the same manner as in the first embodiment. This calculation is performed on 256×256×256=16777216 of all the combinations of RGB data to obtain these colors as target colors. Similarly, in other heat-generating elements 34 as well, calculation of colors which would be developed from the heat-generating characteristics and c data, m data, and y data to which the RGB data is converted is performed on all the combinations of RGB.

Next, for the other heat-generating elements 34, in all the combinations of RGB (16777216 combinations), association with combinations of RGB which make substantially the same color as the reference heat-generating element 34 is performed, and is held as 3D_LUT. This 3D_LUT is created for each of the heat-generating elements 34. The 3D_LUT may be 50331648 data tables of 256×256×256×3, or a suitable number of grids such as 17 grids, 16 grids, 9 grids, or 8 grids, for example, may be set as appropriate. As the method for interpolating values between grids as well, a known method such as tetrahedral interpolation may be used.

In the uneven density correction process performed in S1304 of the present embodiment, the pixel values RGB are corrected but not c data, m data, and y data like the uneven density correction process performed in S1106 of the first embodiment. The present embodiment and the first embodiment are different in this point. The pixel values RGB are converted by using the conversion tables described below which are created for each heat-generating element 34.

R'=3D_LUT [R][G][B][0]

G'=3D_LUT[R][G][B][1]

B'=3D_LUT[R][G][B][2]

As described above, in the present embodiment, it is possible to reduce uneven density due to variations in heat-generating characteristic of the heat-generating elements 34 by correcting pixel values RGB in accordance with the heat-generating characteristic of each heat-generating element 34 of the printing head 30 and the color development heating characteristic of each of the image formation layers 14, 16, and 18 of the print medium 10.

Fourth Embodiment

Figure 14:
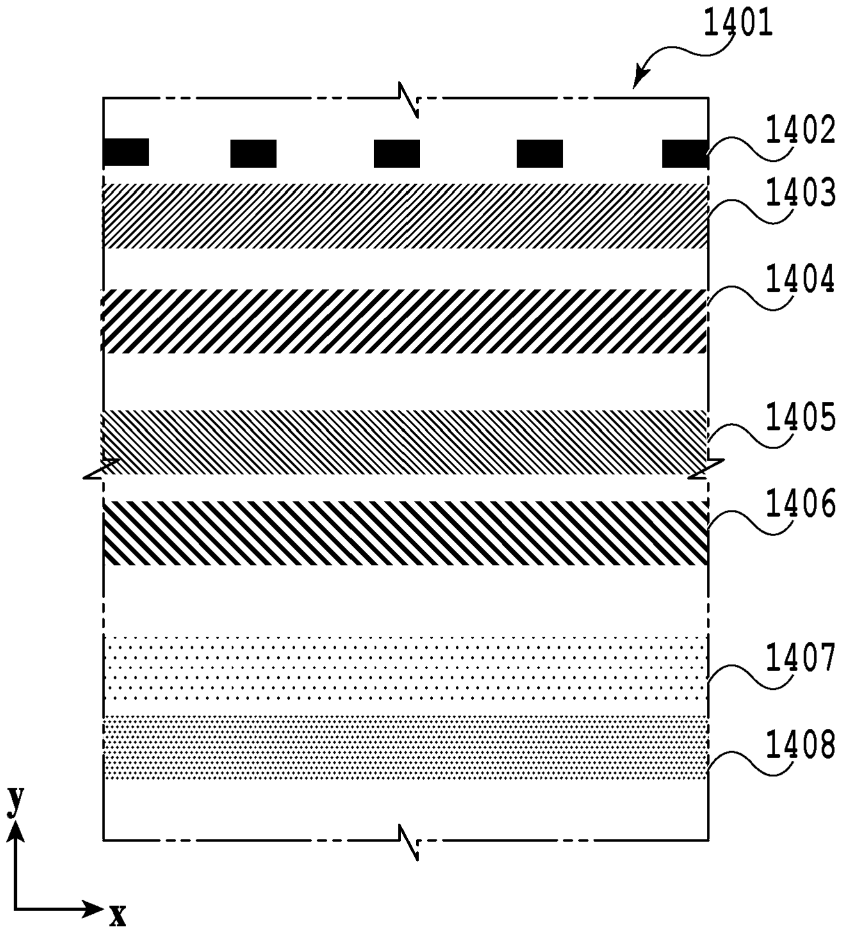
FIG. 14 is a partially enlarged view showing an example of a detection image in a fourth embodiment.

FIG. 14 is a partially enlarged view showing a detection image 1001 printed on a print medium 10 in the present embodiment. In FIG. 14, the y direction is the conveyance direction of the print medium (the width direction of the print medium), and the x direction is a direction orthogonal to the conveyance direction of the print medium 10. A plurality of heat-generating elements 34 of a printing head 30 which performs printing on the print medium 10 are arrayed along the x direction. The detection image 1001 shown in FIG. 14 is an image printed for detecting the heat-generating characteristic of each heat-generating element 34, and includes marks 1402 and analysis regions 1403 to 1408.

The plurality of marks 1402 are printed at predetermined intervals along the width direction (x direction) of the print medium. This plurality of marks 1402 are images use for specifying the positions of the heat-generating elements 34. The plurality of marks 1402 are preferably formed by developing mainly the color of the first image formation layer 14, which develops the color in the shortest heating time. These marks make it possible to associate the heat-generating elements 34 with the detection image at a high precision in reading the printed detection image.

The analysis region 1403 is formed with high-density yellow (Y): (R, G, B), (255, 255, 0). In addition, the analysis region 1404 is printed with low-density yellow (Y): (R, G, B), (255, 255, 128). That is, these two analysis regions 1403 and 1404 are both regions printed by developing mainly the color of the first image formation layer 14, and are regions for detecting the color development heating characteristic in the first image formation layer 14 and the heat-generating characteristic of each heat-generating element 34.

Similarly, the analysis region 1405 is printed with high-density magenta (M): (R, G, B), (255, 0, 255). In addition, the analysis region 1406 is printed with low-density magenta (M): (R, G, B), (255, 128, 255). These analysis regions 1405 and 1406 are regions for detecting mainly the color development heating characteristic of the second image formation layer 16 and the heat-generating characteristic of each heat-generating element 34.

The analysis region 1407 is of high-density cyan (C): (R, G, B)=(0, 255, 255), and the analysis region 1408 is of low-density cyan (C): (R, G, B), (128, 255, 255), which are images for detecting mainly the characteristic of the third image formation layer 18.

Although in the present embodiment, an example of printing representative two gradations in each of the image formation layers 14, 16, and 18 is described, the number of gradations of the regions to be printed may be 3 or more.

It is possible to suppress uneven density in the direction (x direction) in which the heat-generating elements 34 are arrayed by forming the detection image 1001 on the print medium 10, capturing the detection image 1001 with the camera, and adjusting the number of Pulse ONs for each heat-generating element 34.

The ratio of change in the number of Pulse ONs is calculated for each gradation in each of yellow (Y), magenta (M), and cyan (C) as described above, and the result of calculation is used as an uneven density correction value. A target density used in the calculation of the uneven density correction value may be set to a density printed with the heat-generating element 34 with the applied voltage close to the central value among the plurality of heat-generating elements 34, or may be set to a density printed with the heat-generating element 34 with the lowest applied voltage.

In order to develop each color of cyan (C), magenta (M), and yellow (Y) at a desired density, it is necessary to correct the heating energy generated by each heat-generating element 34 by using the aforementioned uneven density correction value. In the present embodiment, an uneven density correction value for correcting each of c, m, and y data representing the number of pulses and pulse width of the heating pulse signal applied to each heat-generating element 34 is created as 1D_LUT, and is held in the printing apparatus 40. That is, 1D_LUT_C for correcting the c data, 1D_LUT_M for correcting the m data, and 1D_LUT_Y for correcting the y data are created for each heat-generating element 34, and are held in the ROM 403 of the printing apparatus 40. This makes it possible to properly correct the heating energy for each gradation of c, m, and y data. Note that since the N-th order color is a combination of yellow (Y), magenta (M), and cyan (C), the uneven density correction value for each of yellow (Y), magenta (M), and cyan (C) is applied.

In addition, since FIG. 10 shows an example of correcting the heating pulse signal for the heat-generating element 34 having an applied voltage lower than the average, the number of Pulse ONs of the heating pulse signal is increased by the correction. However, in a case where correction of a heat-generating element 34 having an applied voltage larger than the average is performed, correction of reducing the number of Pulse ONs of the heating pulse signal is performed.

Fifth Embodiment

In the above-described embodiments, an example of independently correcting c data, m data, and y data, by applying 1D_LUT, respectively, from the uneven density correction value of cyan (C), the uneven density correction value of magenta (M), and the uneven density correction value of yellow (Y) is described, as shown in FIG. 11. In a case where a pixel of a single color is formed on the print medium 10, a heating pulse signal can be accommodated in a heatable time (sections a to Z) defined for forming one pixel as shown in FIG. 10. However, in a case where a pixel of an N-th order color is formed, there is a possibility that the heating pulse signal cannot be accommodated in the heatable time. In particular, in forming a pixel of an N-th order color, in a case where correction of independently increasing the Pulse ON signals of the heating pulse signal for each color is performed, the heating pulse signal of each color is sequentially applied to the print medium. For this reason, there is a possibility that the heating pulse signals of all the colors for forming the N-th order color cannot be accommodated in the heatable time.

Hence, in the present embodiment, c data, m data, and y data are corrected by applying 3D_DLUT. Hereinafter, the present embodiment is described with reference to FIG. 11. Note that since S1101 to S1105 and S1107 to S1108 in FIG. 11 are the same as the processes described in the first embodiment, the description is omitted.

In the uneven density correction process of the aforementioned first embodiment, the number of Pulse ONs of the heating pulse signal of the heat-generating element 34 with the lowest applied voltage is increased, which may cause the heating pulse signal to extend beyond the heatable time. In view of this, in the present embodiment, the heat-generating element 34 with the smallest heating voltage is used as a reference heat-generating element. Moreover, correction of suppressing uneven density is performed by using 3D_LUT_ in which c, m, and y data are combined. In this combination of c, m, and y data, in a case where the heating pulse signal cannot be accommodated in sections a to Z, the ratio of correction change (ratio of change in the number of Pulse ONs) of the c data with the longest heating time among the c, m, and y data is reduced to accommodate the heating pulse signal in the heating pulse time.

Correction values corresponding to all the combinations of c, m, and y data in the reference heat-generating element calculated in this way, and held in 3D_LUT. Note that for other heat-generating elements with high applied voltage, correction values are calculated in such a manner as to obtain substantially the same heating energy as that of the reference heat-generating element, and held in 3D_LUT. In this way, 3D_LUT is created for each heat-generating element, and held in the ROM 403.

In S1106, c, m, and y data are converted to c', m', and y' data in accordance with the heat-generating characteristic of each heat-generating element by using conversion tables described below which are created for each heat-generating element.

c'=3D_LUT [c][m][y][0]

m'=3D_LUT [c][m][y][1]

y'=3D_LUT[c][m][y][2]

The above-described 3D_LUT may be 50331648 data tables of 256×256×256×3, or a suitable number of grids such as 17 grids, 16 grids, 9 grids, or 8 grids, for example, may be set as appropriate. Data corresponding to each grid has values for correcting c, m, and y data. In addition, as the interpolation method for data between grids, any known method such as tetrahedral interpolation may be used. In the present embodiment, it is assumed that the three-dimensional look-up table is specified in advance, and held in the ROM 403 or the like of the printing apparatus 40. By using the above-described three-dimensional look-up table, it is possible to correct c, m, and y data with dependency relation, and thus accommodate the heating pulse signal of each color in the heatable time (sections a to Z) of one pixel.

Other Embodiments

In the above-described embodiments, an example of performing the process of deriving the uneven density correction value, the process of creating a correction table, and the like with the CPU 401 of the printing apparatus 40 is described; however, it is possible to perform these processes in the smartphone 50, which is the host apparatus. For example, it is possible to transmit the heat-generating characteristic of each heat-generating element 34 from the printing apparatus 40, and derive the uneven density correction value or the correction table in the CPU 501 of the smartphone 50 by using the heat-generating characteristic. In this case, the burden required for the processes of the printing apparatus 40 can be mitigated by transmitting the uneven density correction value or correction table thus obtained to the printing apparatus 40 and holding the uneven density correction value or correction table therein.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure makes it possible to properly develop colors in a print medium in which a plurality of different color development layers are laminated by using a plurality of heat-generating elements.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2022-092417 filed Jun. 7, 2022, and No. 2022-092439 filed Jun. 7, 2022, which are hereby incorporated by reference wherein in their entirety.

What is claimed is:

1. A data processing apparatus which processes data for controlling a plurality of heat-generating elements configured to apply heating energies to a print medium having a plurality of laminated color development layers that develop colors different from each other upon receipt of different heating energies, respectively, the heat-generating elements generating the heating energies upon receipt of a voltage, the data processing apparatus comprising:

- an obtaining unit configured to obtain a heat-generating characteristic of each of the plurality of heat-generating elements;
- a generating unit configured to generate print data; and
- a deriving unit configured to derive a correction value for correcting the print data based on a color development heating characteristic of each of the plurality of color development layers and the heat-generating characteristic of each heat-generating element, the print data causing each heat-generating element to generate the heating energy based on image data corresponding to a pixel,
- wherein the generating unit includes a correcting unit configured to generate a second heating signal by correcting a first heating signal based on the correction value, and to output the second heating signal as the print data, the first heating signal being defined in advance based on the color development heating characteristic of each of the plurality of color development layers,
- wherein each of the first heating signal and the second heating signal includes a plurality of voltage pulses to apply the voltage to the heat-generating elements, and
- wherein the correcting unit generates the second heating signal by correcting at least one of the number of pulses and a pulse interval of the voltage pulses included in the first heating signal in accordance with the heat-generating characteristic.

2. The data processing apparatus according to claim 1, wherein the obtaining unit reads a density of a detection image of a single color formed on the print medium by the plurality of heat-generating elements, and obtains the heat-generating characteristic of each heat-generating element based on the read density.

3. The data processing apparatus according to claim 2, wherein, in the detection image, a color development region of a predetermined one of the color development layers is formed to be larger than a color development region of another one of the color development layers.

4. The data processing apparatus according to claim 1, wherein the heat-generating characteristic represents a heat amount of a heating energy generated by the heat-generating element on a predetermined print data.

5. The data processing apparatus according to claim 1, wherein a pulse width and the number of pulses of the voltage pulses specify a heating temperature and a heating time for which the print medium is heated by the heat-generating elements.

6. The data processing apparatus according to claim 1, wherein the correcting unit increases the number of pulses of the voltage pulses included in the second heating signal for a heat-generating element that generates a lower heating energy among the plurality of heat-generating elements.

7. The data processing apparatus according to claim 1, wherein the correcting unit corrects the first heating signal by using a correction table in which a correction value for correcting at least one of the number of pulses and the pulse interval of the voltage pulses included in the first heating signal is defined for each gradation value of each of a plurality of colors corresponding to the color development layers.

8. The data processing apparatus according to claim 1, wherein the print medium includes a first color development layer which develops yellow, a second color development layer which develops magenta, and a third color development layer which develops cyan.

9. The data processing apparatus according to claim 8, wherein, in the print medium, the first color development layer, the second color development layer, and the third color development layer are sequentially laminated from a side on which the heating energies are applied by the heat-generating elements.

10. A data processing apparatus which processes data for controlling a plurality of heat-generating elements configured to apply heating energies to a print medium having a plurality of laminated color development layers that develop colors different from each other upon receipt of different heating energies, respectively, the data processing apparatus comprising:

an obtaining unit configured to obtain a heat-generating characteristic of each of the plurality of heat-generating elements; and a deriving unit configured to derive a correction value for correcting print data based on a color development heating characteristic of each of the plurality of color development layers and the heat-generating characteristic of each heat-generating element, the print data causing each heat-generating element to generate the heating energy based on image data corresponding to a pixel, wherein the obtaining unit reads a density of a detection image of a single color formed on the print medium by the plurality of heat-generating elements, and obtains the heat-generating characteristic of each heat-generating element based on the read density, wherein the detection image includes a preheating region printed for stabilizing temperatures of the heat-generating elements, and an analysis region for detecting the heat-generating characteristics of the heat-generating elements, and wherein the obtaining unit reads a density of the analysis region, analyzes the read density for each of regions corresponding respectively to the plurality of heat-generating elements, and determines the respective heat-generating characteristics of the plurality of heat-generating elements.

11. A data processing apparatus which processes data for controlling a plurality of heat-generating elements configured to apply heating energies to a print medium having a plurality of laminated color development layers that develop colors different from each other upon receipt of different heating energies, respectively, the data processing apparatus comprising:

an obtaining unit configured to obtain a heat-generating characteristic of each of the plurality of heat-generating elements; and a deriving unit configured to derive a correction value for correcting print data based on a color development heating characteristic of each of the plurality of color development layers and the heat-generating characteristic of each heat-generating element, the print data causing each heat-generating element to generate the heating energy based on image data corresponding to a pixel, wherein the obtaining unit reads a density of a detection image of a single color formed on the print medium by the plurality of heat-generating elements, and obtains the heat-generating characteristic of each heat-generating element based on the read density, wherein the plurality of heat-generating elements are arrayed along a first direction, and wherein the detection image includes a first region printed by a plurality of first heat-generating elements which are not adjacent in the first direction among the plurality of heat-generating elements, and a second region formed by a plurality of second heat-generating elements which are adjacent to the first heat-generating elements in the first direction.

12. A data processing apparatus which processes data for controlling a plurality of heat-generating elements configured to apply heating energies to a print medium having a plurality of laminated color development layers which develop colors different from each other upon receipt of different heating energies, respectively, the data processing apparatus comprising:

an obtaining unit configured to obtain a heat-generating characteristic of each of the plurality of heat-generating elements; and a deriving unit configured to derive a correction value for correcting print data based on a color development heating characteristic of each of the plurality of color development layers and the heat-generating characteristic of each heat-generating element, the print data causing each heat-generating element to generate the heating energy based on image data corresponding to a pixel, wherein the obtaining unit reads a density of a detection image of a single color formed on the print medium by the plurality of heat-generating elements, and obtains the heat-generating characteristic of each heat-generating element based on the read density, and wherein the detection image includes, at least:

a third region which is printed when a heating time by the heat-generating elements is shorter than a predetermined time and a heating temperature by the heat-generating elements is equal to or more than a predetermined temperature; and a fourth region which is printed when the heating time by the heat-generating elements is equal to or more than the predetermined time and the heating temperature by the heat-generating elements is less than the predetermined temperature, among the plurality of color development layers.

13. A data processing method for processing data for controlling a plurality of heat-generating elements configured to apply heating energies to a print medium having a plurality of laminated color development layers that develop colors different from each other upon receipt of different heating energies, respectively, the heat-generating elements generating the heating energies upon receipt of a voltage, the data processing method comprising:

obtaining a heat-generating characteristic of each of the plurality of heat-generating elements;

generating print data; and deriving a correction value for correcting the print data based on a color development heating characteristic of each color development layer and the heat-generating characteristic of each heat-generating element, the print data causing each heat-generating element to generate the heating energy based on image data corresponding to a pixel, wherein the generating includes correcting a first heating signal based on the correction value to generate a second heating signal, and outputting the second heating signal as the print data, the first heating signal being defined in advance based on the color development heating characteristic of each of the plurality of color development layers, wherein each of the first heating signal and the second heating signal includes a plurality of voltage pulses to apply voltage to the heat-generating elements, and wherein, in the correcting, the second heating signal is generated by correcting at least one of the number of pulses and a pulse interval of the voltage pulses included in the first heating signal in accordance with the heat-generating characteristic.

14. A non-transitory computer-readable storage medium storing a program for causing a computer to execute a data processing method, wherein the data processing method processes data for controlling a plurality of heat-generating elements configured to apply different heating energies to a print medium having a plurality of laminated color development layers that develop colors different from each other upon receipt of different heating energies, respectively, the heat-generating elements generating the heating energies upon receipt of a voltage, the data processing method comprising:

obtaining a heat-generating characteristic of each of the plurality of heat-generating elements; and deriving a correction value for correcting print data based on a color development heating characteristic of each color development layer and the heat-generating characteristic of each heat-generating element, the print data causing each heat-generating element to generate the heating energy based on image data corresponding to a pixel, and generating the print data, wherein the generating includes correcting a first heating signal based on the correction value to generate a second heating signal, and outputting the second heating signal as the print data, the first heating signal being defined in advance based on the color development heating characteristic of each of the plurality of color development layers, wherein each of the first heating signal and the second heating signal includes a plurality of voltage pulses to apply voltage to the heat-generating elements, and wherein, in the correcting, the second heating signal is generated by correcting at least one of the number of pulses and a pulse interval of the voltage pulses included in the first heating signal in accordance with the heat-generating characteristic.

* * * * *